(12) United States Patent
Beard et al.

(10) Patent No.: US 11,150,629 B2
(45) Date of Patent: *Oct. 19, 2021

(54) QUANTIFYING, TRACKING, AND ANTICIPATING RISK AT A MANUFACTURING FACILITY BASED ON STAFFING CONDITIONS AND TEXTUAL DESCRIPTIONS OF DEVIATIONS

(71) Applicant: Palantir Technologies Inc., Palo Alto, CA (US)

(72) Inventors: Mitchell Beard, Falls Church, VA (US); Kai Shen, Jersey City, NJ (US); Roger Hu, New York City, NY (US); Sachi Shah, San Francisco, CA (US); Miklos Danka, London (GB); Laurynas Pliuskys, London (GB); Thomas Pearson, Twickenham (GB)

(73) Assignee: Palantir Technologies Inc., Palo Alto, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 16/736,484

(22) Filed: Jan. 7, 2020

(65) Prior Publication Data

US 2020/0143302 A1 May 7, 2020

Related U.S. Application Data

(63) Continuation of application No. 15/485,730, filed on Apr. 12, 2017, now Pat. No. 10,579,950, which is a
(Continued)

(51) Int. Cl.
*G05B 19/4063* (2006.01)
*G06Q 10/06* (2012.01)

(52) U.S. Cl.
CPC ..... *G05B 19/4063* (2013.01); *G06Q 10/0635* (2013.01); *G05B 2219/31461* (2013.01)

(58) Field of Classification Search
CPC .......... G05B 19/4063; G05B 19/41885; G05B 2219/31461; G06Q 10/0635; Y02P 90/02
See application file for complete search history.

(56) References Cited

U.S. PATENT DOCUMENTS 6,430,305 B1  8/2002  Decker
6,820,135 B1  11/2004  Dingman et al.
(Continued)

FOREIGN PATENT DOCUMENTS

CN  102546446 A  7/2012
CN  103167093 A  6/2013
(Continued)

OTHER PUBLICATIONS

"5 Great Tools for Visualizing your Twitter Followers", Amnet Blog, [Online] Retrieved from the Internet: <URL: http://www.amnetblog.com/component/content/article/115-5-great-tools-for-visualizing-your-twitter-followers.html>, (Aug. 4, 2010), 1-5.
(Continued)

*Primary Examiner* — M. N. Von Buhr
(74) *Attorney, Agent, or Firm* — Schwegman Lundberg & Woessner, P.A.

(57) ABSTRACT

A system comprising a computer-readable storage medium storing at least one program and a method for determining, tracking, and anticipating risk in a manufacturing facility are presented. In example embodiments, the method includes generating a risk data model for the manufacturing facility based on correlations between historical staffing conditions of the manufacturing facility and deviations from existing manufacturing procedures. The method further includes receiving projected operational data that includes informa-
(Continued)

tion related to anticipated future staffing conditions of the manufacturing facility. The method further includes calculating a risk score based on the projected operational data using the risk data model. The method further includes causing presentation of a user interface that includes a display of the risk score.

20 Claims, 17 Drawing Sheets

Related U.S. Application Data continuation of application No. 14/831,733, filed on Aug. 20, 2015, now Pat. No. 9,671,776.

(56) References Cited

U.S. PATENT DOCUMENTS

| | | |
|---|---|---|
| 6,978,419 B1 | 12/2005 | Kantrowitz |
| 6,980,984 B1 | 12/2005 | Huffman et al. |
| 7,168,039 B2 | 1/2007 | Bertram |
| 7,168,045 B2 | 1/2007 | Fliess et al. |
| 7,617,232 B2 | 11/2009 | Gabbert et al. |
| 7,752,125 B1 | 7/2010 | Kothari et al. |
| 7,756,843 B1 | 7/2010 | Palmer |
| 7,899,796 B1 | 3/2011 | Borthwick et al. |
| 7,917,376 B2 | 3/2011 | Bellin et al. |
| 7,941,321 B2 | 5/2011 | Greenstein et al. |
| 8,036,971 B2 | 10/2011 | Aymeloglu et al. |
| 8,046,283 B2 | 10/2011 | Burns et al. |
| 8,054,756 B2 | 11/2011 | Chand et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,386,377 B1 | 2/2013 | Xiong et al. |
| 8,473,454 B2 | 6/2013 | Evanitsky et al. |
| 8,484,115 B2 | 7/2013 | Aymeloglu et al. |
| 8,577,911 B1 | 11/2013 | Stepinski et al. |
| 8,589,273 B2 | 11/2013 | Creeden et al. |
| 8,660,878 B2 | 2/2014 | Bernardini et al. |
| 8,688,573 B1 | 4/2014 | Rukonic et al. |
| 8,694,969 B2 | 4/2014 | Bernardini et al. |
| 8,739,290 B1 | 5/2014 | Jamail et al. |
| 8,744,890 B1 | 6/2014 | Bernier et al. |
| 8,769,412 B2 | 7/2014 | Gill et al. |
| 8,781,882 B1 | 7/2014 | Arboletti et al. |
| 8,793,151 B2 | 7/2014 | DelZoppo et al. |
| 8,812,960 B1 | 8/2014 | Sun et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 9,069,842 B2 | 6/2015 | Melby |
| 9,100,428 B1 | 8/2015 | Visbal |
| 9,129,219 B1 | 9/2015 | Robertson et al. |
| 9,256,664 B2 | 2/2016 | Chakerian et al. |
| 9,323,234 B2 | 4/2016 | Zhou et al. |
| 9,671,776 B1 | 6/2017 | Beard et al. |
| 10,579,950 B1 | 3/2020 | Beard et al. |
| 2002/0065708 A1 | 5/2002 | Senay et al. |
| 2002/0095360 A1 | 7/2002 | Joao |
| 2002/0095658 A1 | 7/2002 | Shulman et al. |
| 2002/0103705 A1 | 8/2002 | Brady |
| 2002/0147805 A1 | 10/2002 | Leshem et al. |
| 2003/0126102 A1 | 7/2003 | Borthwick |
| 2004/0001103 A1 | 1/2004 | Fliess et al. |
| 2004/0034570 A1 | 2/2004 | Davis |
| 2004/0111480 A1 | 6/2004 | Yue |
| 2004/0153418 A1 | 8/2004 | Hanweck |
| 2004/0153437 A1 | 8/2004 | Buchan |
| 2004/0215551 A1 | 10/2004 | Eder |
| 2004/0236688 A1 | 11/2004 | Bozeman |
| 2004/0256718 A1 | 12/2004 | Chandler et al. |
| 2005/0010472 A1 | 1/2005 | Quatse et al. |
| 2005/0086207 A1 | 4/2005 | Heuer et al. |
| 2005/0154628 A1 | 7/2005 | Eckart et al. |
| 2005/0154769 A1 | 7/2005 | Eckart et al. |
| 2005/0228688 A1 | 10/2005 | Visser et al. |
| 2006/0026120 A1 | 2/2006 | Carolan et al. |
| 2006/0080283 A1 | 4/2006 | Shipman |
| 2006/0143034 A1 | 6/2006 | Rothermel et al. |
| 2006/0143075 A1 | 6/2006 | Carr et al. |
| 2006/0143079 A1 | 6/2006 | Basak et al. |
| 2006/0173762 A1 | 8/2006 | Clater |
| 2006/0190391 A1 | 8/2006 | Cullen et al. |
| 2007/0000999 A1 | 1/2007 | Kubo et al. |
| 2007/0011304 A1 | 1/2007 | Error |
| 2007/0038646 A1 | 2/2007 | Thota |
| 2007/0150801 A1 | 6/2007 | Chidlovskii et al. |
| 2007/0156673 A1 | 7/2007 | Maga et al. |
| 2007/0162454 A1 | 7/2007 | D' Albora et al. |
| 2007/0185867 A1 | 8/2007 | Maga et al. |
| 2007/0192122 A1 | 8/2007 | Routson et al. |
| 2007/0194097 A1 | 8/2007 | Jones et al. |
| 2007/0284433 A1 | 12/2007 | Domenica et al. |
| 2008/0103996 A1 | 5/2008 | Forman et al. |
| 2008/0208735 A1 | 8/2008 | Balet et al. |
| 2008/0222295 A1 | 9/2008 | Robinson et al. |
| 2008/0255973 A1 | 10/2008 | El Wade et al. |
| 2008/0256131 A1 | 10/2008 | Shimohara |
| 2008/0313132 A1 | 12/2008 | Hao et al. |
| 2009/0055795 A1 | 2/2009 | Finlayson et al. |
| 2009/0094270 A1 | 4/2009 | Alirez et al. |
| 2009/0106178 A1 | 4/2009 | Chu |
| 2009/0112745 A1 | 4/2009 | Stefanescu |
| 2009/0125359 A1 | 5/2009 | Knapic et al. |
| 2009/0125459 A1 | 5/2009 | Norton et al. |
| 2009/0157732 A1 | 6/2009 | Hao et al. |
| 2009/0187546 A1 | 7/2009 | Whyte |
| 2009/0187548 A1 | 7/2009 | Ji et al. |
| 2009/0249244 A1 | 10/2009 | Robinson et al. |
| 2009/0271343 A1 | 10/2009 | Vaiciulis et al. |
| 2009/0307049 A1 | 12/2009 | Elliott, Jr. et al. |
| 2009/0313463 A1 | 12/2009 | Pang et al. |
| 2009/0319418 A1 | 12/2009 | Herz |
| 2009/0319891 A1 | 12/2009 | MacKinlay et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith |
| 2010/0070842 A1 | 3/2010 | Aymeloglu et al. |
| 2010/0098318 A1 | 4/2010 | Anderson |
| 2010/0106752 A1 | 4/2010 | Eckardt, III et al. |
| 2010/0114887 A1 | 5/2010 | Conway et al. |
| 2010/0131502 A1 | 5/2010 | Fordham |
| 2010/0161735 A1 | 6/2010 | Sharma |
| 2010/0191563 A1 | 7/2010 | Schlaifer et al. |
| 2010/0235915 A1 | 9/2010 | Memon et al. |
| 2010/0262688 A1 | 10/2010 | Hussain et al. |
| 2010/0312837 A1 | 12/2010 | Bodapati et al. |
| 2011/0047114 A1 | 2/2011 | Marvell et al. |
| 2011/0061013 A1 | 3/2011 | Bilicki et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0153384 A1 | 6/2011 | Horne et al. |
| 2011/0173093 A1 | 7/2011 | Psota et al. |
| 2011/0191138 A1 | 8/2011 | Saraf |
| 2011/0208565 A1 | 8/2011 | Ross et al. |
| 2011/0213655 A1 | 9/2011 | Henkin et al. |
| 2011/0218955 A1 | 9/2011 | Tang et al. |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine et al. |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |

(56) References Cited

U.S. PATENT DOCUMENTS

| | | |
|---|---|---|
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0131512 A1 | 5/2012 | Takeuchi et al. |
| 2012/0158527 A1 | 6/2012 | Cannelongo |
| 2012/0159362 A1 | 6/2012 | Brown et al. |
| 2012/0173381 A1 | 7/2012 | Smith |
| 2012/0215574 A1 | 8/2012 | Driessnack et al. |
| 2012/0215784 A1 | 8/2012 | King et al. |
| 2012/0221553 A1 | 8/2012 | Wittmer et al. |
| 2012/0226523 A1 | 9/2012 | Weiss et al. |
| 2012/0245976 A1 | 9/2012 | Kumar et al. |
| 2012/0323888 A1 | 12/2012 | Osann, Jr. |
| 2013/0016106 A1 | 1/2013 | Yip et al. |
| 2013/0035909 A1 | 2/2013 | Douady et al. |
| 2013/0054306 A1 | 2/2013 | Bhalla et al. |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson et al. |
| 2013/0185307 A1 | 7/2013 | El-yaniv et al. |
| 2013/0226318 A1 | 8/2013 | Procyk et al. |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0325544 A1 | 12/2013 | Bonin et al. |
| 2014/0012796 A1 | 1/2014 | Petersen et al. |
| 2014/0040371 A1 | 2/2014 | Gurevich et al. |
| 2014/0058914 A1 | 2/2014 | Song et al. |
| 2014/0068487 A1 | 3/2014 | Steiger et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0156584 A1 | 6/2014 | Motukuri et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0257918 A1 | 9/2014 | Spencer et al. |
| 2014/0337086 A1 | 11/2014 | Asenjo et al. |
| 2014/0344230 A1 | 11/2014 | Krause et al. |
| 2014/0350985 A1 | 11/2014 | Pink |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106170 A1 | 4/2015 | Bonica |
| 2015/0106379 A1 | 4/2015 | Elliot et al. |
| 2015/0135256 A1 | 5/2015 | Hoy et al. |
| 2015/0178647 A1 | 6/2015 | Wiggins et al. |
| 2015/0188872 A1 | 7/2015 | White |
| 2015/0242401 A1 | 8/2015 | Liu |
| 2015/0281287 A1 | 10/2015 | Gill et al. |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0063192 A1 | 3/2016 | Johnson et al. |
| 2016/0125344 A1 | 5/2016 | Carmeli et al. |
| 2016/0148132 A1 | 5/2016 | Aqlan et al. |
| 2016/0320768 A1 | 11/2016 | Zhao et al. |

FOREIGN PATENT DOCUMENTS

| | | |
|---|---|---|
| CN | 102054015 B | 5/2014 |
| DE | 102014204827 A1 | 9/2014 |
| DE | 102014204830 A1 | 9/2014 |
| DE | 102014204834 A1 | 9/2014 |
| EP | 2487610 A2 | 8/2012 |
| EP | 2858018 A1 | 4/2015 |
| EP | 2869211 A2 | 5/2015 |
| EP | 2889814 A1 | 7/2015 |
| EP | 2892197 A1 | 7/2015 |
| EP | 2963595 A1 | 1/2016 |
| WO | WO-2005116851 A2 | 12/2005 |

OTHER PUBLICATIONS

"About OWA", Open Web Analytics, [Online]. Retrieved from the Internet: <URL: http://www.openwebanalytics.com/?page_jd=2>, (Accessed: Jul. 19, 2013), 5 pgs.

"An Introduction to KeyLines and Network Visualization", Keylines. com, [Online]. Retrieved from the Internet: <URL: http://keylines.com/wp-content/uploads/2014/03/KeyLines-White-Paper.pdf>, (Mar. 2014), 8 pgs.

"Analytics for Data Driven Startups", Trak.io, [Online]. Retrieved from the Internet: <URL: http://trak.io/>, (Accessed: Jul. 18, 2013), 3 pgs.

"U.S. Appl. No. 13/827,491, Final Office Action dated Jun. 22, 2015", 28 pgs.

"U.S. Appl. No. 13/827,491, Non Final Office Action dated Oct. 9, 2015", 16 pgs.

"U.S. Appl. No. 13/827,491, Non Final Office Action dated Dec. 1, 2014", 5 pgs.

"U.S. Appl. No. 14/141,252, Non Final Office Action dated Oct. 8, 2015", 11 pgs.

"U.S. Appl. No. 14/225,006, Advisory Action dated Dec. 21, 2015", 4 pgs.

"U.S. Appl. No. 14/225,006, Final Office Action dated Sep. 2, 2015", 28 pgs.

"U.S. Appl. No. 14/225,006, First Action Interview Pre-Interview Communication dated Feb. 27, 2015", 5 pgs.

"U.S. Appl. No. 14/225,006, First Action Interview Pre-Interview Communication dated Sep. 10, 2014", 4 pgs.

"U.S. Appl. No. 14/225,084, Examiner Interview Summary dated Jan. 4, 2016", 3 pgs.

"U.S. Appl. No. 14/225,084, First Action Interview Pre-Interview Communication dated Feb. 20, 2015", 5 pgs.

"U.S. Appl. No. 14/225,084, First Action Interview Pre-Interview Communication dated Sep. 2, 2014", 17 pgs.

"U.S. Appl. No. 14/225,084, Non Final Office Action dated Sep. 11, 2015", 13 pgs.

"U.S. Appl. No. 14/225,084, Notice of Allowance dated May 4, 2015", 26 pgs.

"U.S. Appl. No. 14/225,160, Advisory Action dated May 20, 2015", 7 pgs.

"U.S. Appl. No. 14/225,160, Final Office Action dated Jan. 25, 2016", 25 pgs.

"U.S. Appl. No. 14/225,160, Final Office Action dated Feb. 11, 2015", 30 pgs.

"U.S. Appl. No. 14/225,160, First Action Interview Pre-Interview Communication dated Jul. 29, 2014", 19 pgs.

"U.S. Appl. No. 14/225,160, First Action Interview Pre-Interview Communication dated Oct. 22, 2014", 6 pgs.

"U.S. Appl. No. 14/225,160, Non Final Office Action dated Aug. 12, 2015", 23 pgs.

"U.S. Appl. No. 14/306,138, Advisory Action dated Dec. 24, 2015", 4 pgs.

(56) References Cited

OTHER PUBLICATIONS

"U.S. Appl. No. 14/306,138, Examiner Interview Summary dated Dec. 3, 2015", 3 pgs.
"U.S. Appl. No. 14/306,147, Final Office Action dated Dec. 24, 2015", 22 pgs.
"U.S. Appl. No. 14/319,161, Final Office Action dated Jan. 23, 2015", 21 pgs.
"U.S. Appl. No. 14/319,161, Notice of Allowance dated May 4, 2015", 6 pgs.
"U.S. Appl. No. 14/319,765, Non Final Office Action dated Feb. 1, 2016", 19 pgs.
"U.S. Appl. No. 14/323,935, Notice of Allowance dated Oct. 1, 2015", 8 pgs.
"U.S. Appl. No. 14/451,221, Non Final Office Action dated Oct. 21, 2014", 16 pgs.
"U.S. Appl. No. 14/463,615, Advisory Action dated Sep. 10, 2015", 3 pgs.
"U.S. Appl. No. 14/463,615, Final Office Action dated May 21, 2015", 31 pgs.
"U.S. Appl. No. 14/463,615, First Action Interview Pre-Interview Communication dated Jan. 28, 2015", 29 pgs.
"U.S. Appl. No. 14/463,615, First Action Interview Pre-Interview Communication dated Nov. 13, 2014", 4 pgs.
"U.S. Appl. No. 14/463,615, Non Final Office Action dated Dec. 9, 2015", 44 pgs.
"U.S. Appl. No. 14/479,863, First Action Interview Pre-Interview Communication dated Dec. 26, 2014", 5 pgs.
"U.S. Appl. No. 14/479,863, Notice of Allowance dated Mar. 31, 2015", 23 pgs.
"U.S. Appl. No. 14/483,527, Final Office Action dated Jun. 22, 2015", 17 pgs.
"U.S. Appl. No. 14/483,527, First Action Interview Pre-Interview Communication dated Jan. 28, 2015", 6 pgs.
"U.S. Appl. No. 14/483,527, Non Final Office Action dated Oct. 28, 2015", 20 pgs.
"U.S. Appl. No. 14/552,336, First Action Interview Pre-Interview Communication dated Jul. 20, 2015", 18 pgs.
"U.S. Appl. No. 14/552,336, Notice of Allowance dated Nov. 3, 2015", 13 pgs.
"U.S. Appl. No. 14/562,524, First Action Interview Pre-Interview Communication dated Sep. 14, 2015", 12 pgs.
"U.S. Appl. No. 14/562,524, First Action Interview Pre-Interview Communication dated Nov. 10, 2015", 6 pgs.
"U.S. Appl. No. 14/571,098, Final Office Action dated Feb. 23, 2016", 37 pgs.
"U.S. Appl. No. 14/571,098, First Action Interview dated Aug. 24, 2015", 4 pgs.
"U.S. Appl. No. 14/571,098, First Action Interview Pre-Interview Communication dated Mar. 11, 2015", 4 pgs.
"U.S. Appl. No. 14/571,098, First Action Interview Pre-Interview Communication dated Aug. 5, 2015", 4 pgs.
"U.S. Appl. No. 14/571,098, First Action Interview Pre-Interview Communication dated Nov. 10, 2015", 5 pgs.
"U.S. Appl. No. 14/631,633, First Action Interview Pre-Interview Communication dated Sep. 10, 2015", 5 pgs.
"U.S. Appl. No. 14/676,621, Examiner Interview Summary dated Jul. 30, 2015", 5 pgs.
"U.S. Appl. No. 14/676,621, Final Office Action dated Oct. 29, 2015", 10 pgs.
"U.S. Appl. No. 14/746,671, First Action Interview Pre-Interview Communication dated Sep. 28, 2015", 5 pgs.
"U.S. Appl. No. 14/746,671, First Action Interview Pre-Interview Communication dated Nov. 12, 2015", 19 pgs.
"U.S. Appl. No. 14/746,671, Notice of Allowance dated Jan. 21, 2016", 7 pgs.
"U.S. Appl. No. 14/800,447, First Action Interview—Pre-Interview Communication dated Dec. 10, 2015", 6 pgs.
"U.S. Appl. No. 14/813,749, Non Final Office Action dated Sep. 28, 2015", 22 pgs.
"U.S. Appl. No. 14/831,733, Examiner Interview Summary dated Jul. 26, 2016", 3 pgs.
"U.S. Appl. No. 14/831,733, Final Office Action dated Dec. 2, 2016", 8 pgs.
"U.S. Appl. No. 14/831,733, First Action Interview—Office Action Summary dated Jul. 26, 2016".
"U.S. Appl. No. 14/831,733, First Action Interview Pre-Interview Communication dated Feb. 25, 2016", 4 pgs.
"U.S. Appl. No. 14/831,733, Notice of Allowability dated Mar. 10, 2017", 4 pgs.
"U.S. Appl. No. 14/831,733, Notice of Allowance dated Feb. 22, 2017", 8 pgs.
"U.S. Appl. No. 14/831,733, Response filed Mar. 28, 2016 to First Action Interview Pre-Interview Communication dated Feb. 25, 2016", 4 pgs.
"U.S. Appl. No. 14/831,733, Response filed Sep. 26, 2016 to First Action Interview—Office Action Summary dated Jul. 26, 2016", 22 pgs.
"U.S. Appl. No. 14/842,734, First Action Interview Pre-Interview Communication dated Nov. 19, 2015", 17 pgs.
"U.S. Appl. No. 14/929,584, Non Final Office Action dated Feb. 4, 2016", 15 pgs.
"U.S. Appl. No. 15/485,730, Final Office Action dated Jul. 31, 2019", 5 pgs.
"U.S. Appl. No. 15/485,730, First Action Interview—Office Action Summary dated Feb. 20, 2019", 5 pgs.
"U.S. Appl. No. 15/485,730, First Action Interview—Pre-Interview Communication dated Oct. 19, 2018", 3 pgs.
"U.S. Appl. No. 15/485,730, Notice of Allowance dated Oct. 22, 2019", 5 pgs.
"U.S. Appl. No. 15/485,730, Response filed Apr. 23, 2019 to First Action Interview—Office Action Summary dated Feb. 20, 2019", 14 pgs.
"U.S. Appl. No. 15/485,730, Response filed Sep. 30, 2019 to Final Office Action dated Jul. 31, 2019", 12 pgs.
"Apsalar—Mobile App Analytics & Advertising", Data Powered Mobile Advertising, https://apsalar.com/, (Jul. 18, 2013), 1-8.
"Beta Testing on the Fly", TestFlight, [Online]. Retrieved from the Internet: <URL: https ://testflightapp. com/>, (Accessed: Jul. 18, 2013), 3 pgs.
"Countly", Countly Mobile Analytics, [Online]. Retrieved from the Internet: <URL: http://count.ly/products/screenshots, (accessed Jul. 18, 2013), 9 pgs.
"DISTIMO—App Analytics", [Online]. Retrieved from the Internet: <URL: http://www.distimo.com/app-analytics, (accessed Jul. 18, 2013), 5 pgs.
"European Application Serial No. 14187996.5, Extended European Search Report dated Feb. 12, 2015", 7 pgs.
"European Application Serial No. 14191540.5, Extended European Search Report dated May 27, 2015", 9 pgs.
"European Application Serial No. 14200246.8, Extended European Search Report dated May 29, 2015", 8 pgs.
"European Application Serial No. 14200298.9, Extended European Search Report dated May 13, 2015", 7 pgs.
"European Application Serial No. 15181419.1, Extended European Search Report dated Sep. 29, 2015", 7 pgs.
"European Application Serial No. 15184764.7, Extended European Search Report dated Dec. 14, 2015", 8 pgs.
"Flurry Analytics", [Online]. Retrieved from the Internet: <URL: http://www.flurry.com/, (accessed Jul. 18, 2013), 14 pgs.
"Google Analytics Official Website—Web Analytics & Reporting", [Online]. Retrieved from the Internet: <URL: http ://www.google.com/ analytics/index.html, (accessed Jul. 18, 2013), 22 pgs.
"Great Britain Application Serial No. 1404486.1, Combined Search Report and Examination Report dated Aug. 27, 2014", 5 pgs.
"Great Britain Application Serial No. 1404486.1, Office Action dated May 21, 2015", 2 pgs.
"Great Britain Application Serial No. 1404489.5, Combined Search Report and Examination Report dated Aug. 27, 2014", 5 pgs.
"Great Britain Application Serial No. 1404489.5, Office Action dated May 21, 2015", 3 pgs.
"Great Britain Application Serial No. 1404489.5, Office Action dated Oct. 6, 2014", 1 pg.

(56) References Cited

OTHER PUBLICATIONS

"Great Britain Application Serial No. 1404499.4, Combined Search Report and Examination Report dated Aug. 20, 2014", 6 pgs.
"Great Britain Application Serial No. 1404499.4, Office Action dated Jun. 11, 2015", 5 pgs.
"Great Britain Application Serial No. 1404499.4, Office Action dated Sep. 29, 2014", 1 pg.
"Help File for ModelRisk Version 5—Part 1", Vose Software, (2007), 375 pgs.
"Help File for ModelRisk Version 5—Part 2", Vose Software, (2007), 362 pgs.
"Hunchlab: Heat Map and Kernel Density Calculation for Crime Analysis", Azavea Journal, [Online], Retrieved from the Internet: <URL: www.azavea.com/blogs/newsletter/v4i4/kernel-density-capabilities-added-to-hunchlab>, (Sep. 9, 2014), 2 pgs.
"KeyLines Datasheet", Keylines.com, [Online]. Retrieved from the Internet: <URL: http://keylines.com/wp-content/uploads/2014/03/KeyLines-datasheet.pdf>, (Mar. 2014), 2 pgs.
"Mixpanel: Actions speak louder than page views", Mobile Analytics, [Online]. Retrieved from the Internet: <URL: https://mixpanel.com/>, (Accessed: Jul. 18, 2013), 13 pgs.
"Mobile App Marketing & Analytics", Localytics, [Online]. Retrieved from the Internet: <URL: http://www.localytics.com/>, (Accessed: Jul. 18, 2013), 12 pgs.
"More than android analytics", UserMetrix, [Online], Retrieved from the Internet: <URL: http://usermetrix.com/android-analytics>, (Accessed: Jul. 18, 2013), 3 pgs.
"More Than Mobile Analytics", Kontagent, [Online]. Retrieved from the Internet: <URL: http://www. kontagent. com/>, (Accessed: Jul. 18, 2013), 9 pgs.
"Multimap", Wikipedia, [Online]. Retrieved from the Internet: <URL: https://en.wikipedia.org/w/index.php?title=Multimap&oldid=530800748>, (Jan. 1, 2013), 2 pgs.
"Netherlands Application Serial No. 2012417, Netherlands Search Report dated Sep. 18, 2015", W/ English Translation, 9 pgs.
"Netherlands Application Serial No. 2012421, Netherlands Search Report dated Sep. 18, 2015", 8 pgs.
"Netherlands Application Serial No. 2012438, Search Report dated Sep. 21, 2015", 8 pgs.
"New Zealand Application Serial No. 622473, First Examination Report dated Mar. 27, 2014", 3 pgs.
"New Zealand Application Serial No. 622473, Office Action dated Jun. 19, 2014", 2 pgs.
"New Zealand Application Serial No. 622513, Office Action dated Apr. 3, 2014", 2 pgs.
"New Zealand Application Serial No. 628161, First Examination Report dated Aug. 25, 2014", 2 pgs.
"Piwik—Free Web Analytics Software", Piwik, [Online]. Retrieved from the Internet: <URL: http://piwik.org/>, (Accessed: Jul. 19, 2013), 18 pgs.
"Realtime Constant Customer Touchpoint", Capptain—Pilot your apps, [Online] Retrieved from the Internet: <URL: http://www.capptain.com>, (accessed Jul. 18, 2013), 6 pgs.
"Refresh CSS ellipsis when resizing container", Stack Overflow, [Online]. Retrieved from the Internet: <URL: http://stackoverflow.com/questions/17964681/refresh-css-ellipsis-when-resizing-container>, Accessed: May 18, 2015, (Jul. 31, 2013), 1 pg.
"Smart Thinking for Super Apps", Appacts: Open Source Mobile Analytics Platform, [Online] Retrieved from the Internet: <URL: http://www.appacts.com>, (Jul. 18, 2013), 1-4.
"Visualizing Threats: Improved Cyber Security Through Network Visualization", Keylines.com, [Online] Retrieved from the Internet: <URL: http://keylines.com/wp-content/uploads/2014/04/Visualizing-Threats1.pdf>, (May 12, 2014), 10 pgs.
"Welcome to StatCounter—Visitor Analysis for Your Website", StatCounter—Free Invisible Web Tracker, Hit Counter and Web Stats, [Online]. Retrieved from the Internet: <URL: http://statcounter.com/>, (Accessed: Jul. 19, 2013), 17 pgs.
Celik, T, "CSS Basic User Interface Module Level 3 (CSS3 UI)", Section 8; Resizing and Overflow, [Online] Retrieved from the Internet: <http://www.w3.org/TR/2012/WD-css3-ui-20120117/#resizing-amp-overflow>, (Jan. 17, 2012), 1-58.
Chaudhuri, Surajit, et al., "An Overview of Business Intelligence Technology", Communications of the ACM, vol. 54, No, 8., (Aug. 2011), 88-98.
Cohn, David, et al., "Semi-supervised Clustering with User Feedback", Cornell University, Constrained Clustering: Advances in Algorithms, Theory, and Applications 4.1, (2003), 9 pgs.
Gorr, et al., "Crime Hot Spot Forecasting: Modeling and Comparative Evaluation", Grant 98-IJ-CX-K005, (May 6, 2002), 37 pgs.
Gu, Lifang, et al., "Record Linkage: Current Practice and Future Directions", (Jan. 15, 2004), 32 pgs.
Hansen, D., et al., "Analyzing Social Media Networks with NodeXL: Insights from a Connected World", Chapter 4, pp. 53-67 and Chapter 10, pp. 143-164, (Sep. 2010), 53-67; 143-164.
Hua, Yu, et al., "A Multi-attribute Data Structure with Parallel Bloom Filters for Network Services", HiPC 2006, LNCS 4297, (2006), 277-288.
Manno, et al., "Introducing Collaboration in Single-user Applications through the Centralized Control Architecture", (2010), 10 pgs.
Sigrist, Christian, et al., "PROSITE, a Protein Domain Database for Functional Characterization and Annotation", Nucleic Acids Research, vol. 38, (2010), D161-D166.
Valentini, Giorgio, et al., "Ensembles of Learning Machines", Lecture Notes in Computer Science: Neural Nets, Springer Berlin Heidelberg, (Sep. 26, 2002), 3-20.
Wang, Guohua, et al., "Research on a Clustering Data De-Duplication Mechanism Based on Bloom Filter", IEEE, (2010), 5 pgs.

FUTURE PROJECTIONS — 1400

| | TEMP CONVERSIONS — 1402<br>[0] 1···3···5···8···10 | % TEMP HIRES — 1404<br>[0] 0···25···50···75···100 |
|---|---|---|

CHANGE IN OVERTIME

| | CHANGE IN HEADCOUNT | | |
|---|---|---|---|
| | −5% | +0% | +5% |
| +5% | FULL-TIME −12<br>TEMP 0<br>OVERTIME 50000 | FULL-TIME 0<br>TEMP 0<br>OVERTIME 50000 | FULL-TIME 12<br>TEMP 0<br>OVERTIME 50000 |
| | FULL-TIME −12<br>TEMP 0<br>OVERTIME 0 | FULL-TIME 0<br>TEMP 0<br>OVERTIME 0 | FULL-TIME 12<br>TEMP 0<br>OVERTIME 0 |
| −7% | FULL-TIME −12<br>TEMP 0<br>OVERTIME −50000 | FULL-TIME 0<br>TEMP 0<br>OVERTIME −50000 | FULL-TIME 12<br>TEMP 0<br>OVERTIME −50000 — 1408 |

QUANTIFYING, TRACKING, AND ANTICIPATING RISK AT A MANUFACTURING FACILITY BASED ON STAFFING CONDITIONS AND TEXTUAL DESCRIPTIONS OF DEVIATIONS

PRIORITY CLAIM

This application is a continuation of and claims the benefit of U.S. patent application Ser. No. 15/485,730, filed Apr. 12, 2017, now issued as U.S. Pat. No. 10,579,950, which is a continuation of and claims the benefit of U.S. patent application Ser. No. 14/831,733, filed on Aug. 20, 2015, now issued as U.S. Pat. No. 9,671,776, both of which are incorporated herein by reference in their entireties.

TECHNICAL FIELD

The subject matter disclosed herein relates to data processing. In particular, example embodiments may relate to techniques for quantifying, tracking, and anticipating risk at a manufacturing facility.

BACKGROUND

Product manufacturing, especially pharmaceutical drug manufacturing necessarily entails some amount of risk. That is to say that in many manufacturing procedures that may be used in making products, there always exists some probability that an issue may occur. In some instances, deviations in an established manufacturing procedure may lead to unrecoverable product losses, and thus, unrecoverable profit loss. Even worse, if undetected, a deviation in the manufacturing process of a product has potential to cause injury to an end consumer of the product.

It is therefore important for manufacturing facility stakeholders to be able to understand what aspects of their manufacturing facility's operations contribute to risk so that corrective action can be taken to avoid or mitigate such risk in the future. However, achieving a common and accurate understanding of the risk is difficult because individual stakeholders may recognize different risk factors, and may attribute different severities to each factor. Further, heuristic methods used in traditional industry practice, which are devoid of data-driven metrics and analysis, often fail to identify correct risk factors and further fail to accurately determine a probability that such factors will actually lead to an issue occurring.

BRIEF DESCRIPTION OF THE DRAWINGS

Various ones of the appended drawings merely illustrate example embodiments of the present inventive subject matter and cannot be considered as limiting its scope.

FIG. 14 is an interface diagram illustrating a user interface for presenting risk analytics associated with future projections, according to example embodiments.

DETAILED DESCRIPTION

Figure 1:
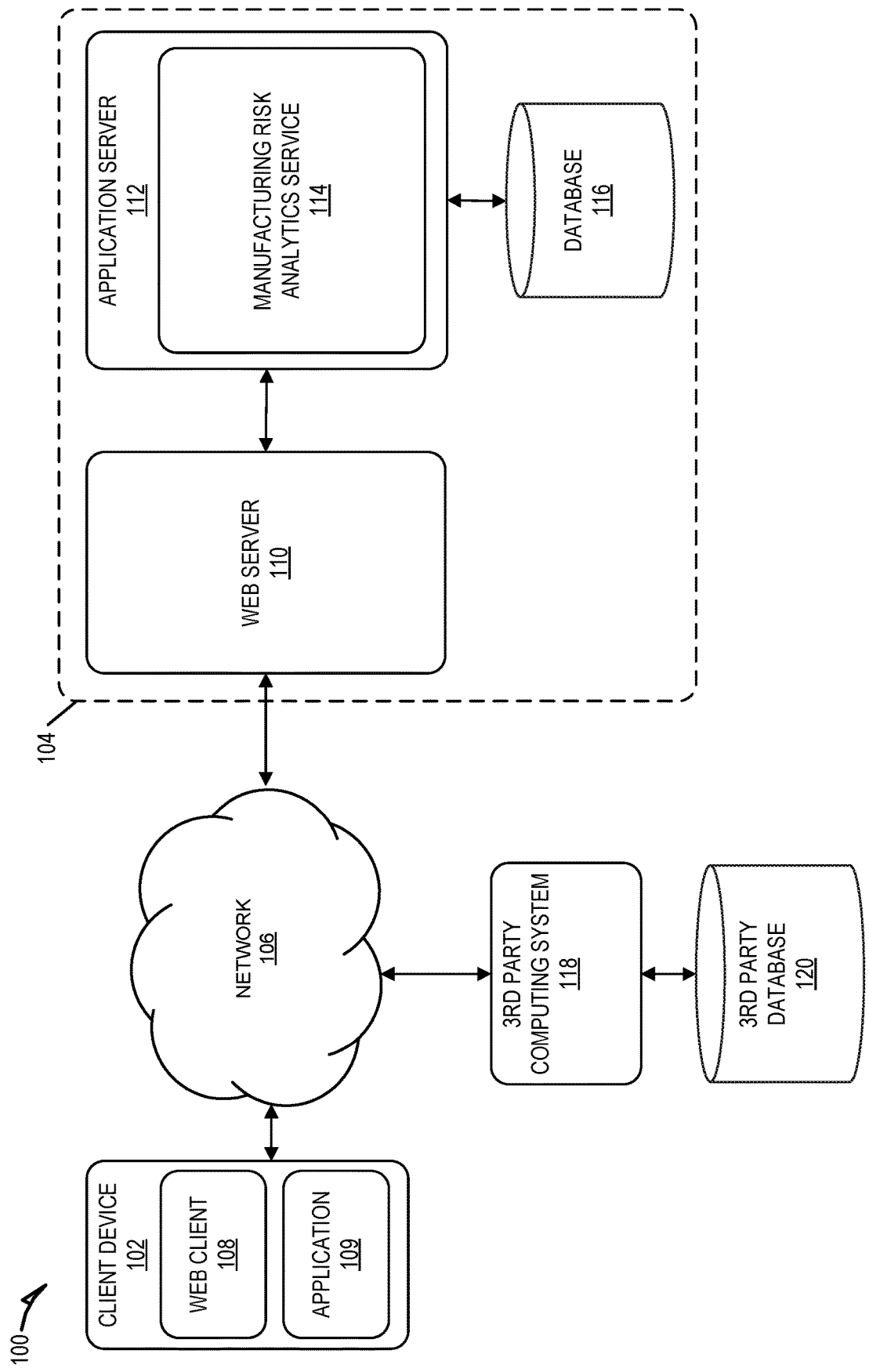
FIG. 1 is an architecture diagram depicting a data processing platform having a client-server architecture configured for exchanging data, according to an example embodiment.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure relate to systems and methods for quantifying, tracking, and anticipating risk in a manufacturing facility. Example embodiments involve systems and methods for generating various risk analytics associated with the manufacturing facility. The risk analytics are generated by analyzing data related to the operations of the manufacturing facility. For example, the method may include analyzing deviation reports that describe deviations from existing manufacturing procedures (referred to hereinafter simply as "deviations"). These deviations provide a quantifiable representation of the risk associated with the manufacturing facility. In example embodiments, the deviation reports are analyzed to provide an overview of the deviations that occur over time as well as a breakdown of deviations by type, subtype, root cause, work center, line-operations, product, and criticality, for example. Further, classification logic may be employed in the analysis of deviations reports to classify deviations into groups to enable the identification of repeat deviations.

Additional example embodiments involve systems and methods to generate a risk data model for the manufacturing facility. The risk data model may be used to determine the level of risk associated with the manufacturing facility. Accordingly, the risk data model includes factors that contribute to the risk in the manufacturing facility and indicators of the relative contribution each factor makes to the overall risk. The risk data model may be developed through an analysis of deviations that have occurred in the manufacturing facility and staffing conditions during such deviations. More particularly, at least some of the risk factors included in the risk data model are based on correlations between the deviations and the staffing conditions. Additional risk factors included in the risk data model may, for example, relate to financial risks (e.g., risk of financial issues affecting the manufacturing site), manufacturing risk (e.g., risk of manufacturing problems such as those caused by legacy systems), risks associated with excipients (e.g., risk of input materials and chemicals causing a problem), risks associated with change control (e.g., risk associated with change control events such as new processes or procedures, or failure to adhere to existing ones), and risk associated with mother nature (e.g., lightning storms, high humidity, high or low temperatures, or the like).

Additional example embodiments involve systems and methods to determine a risk level associated with the manufacturing facility. The determination of the risk level includes calculating a risk score for the manufacturing facility using a risk data model and information related to current or projected staffing conditions of the manufacturing facility. The risk score is then used to determine the overall risk level of the facility as well as risk levels associated with individual risk factors. Risk analytics, risk scores, and risk levels are presented to users such as stakeholders of the manufacturing facility so as to assist those stakeholders in making informed decisions about actions to take to avoid, or at least mitigate, further risk.

FIG. 1 is an architecture diagram depicting a network system 100 having a client-server architecture configured for exchanging data, according to an example embodiment. While the network system 100 shown in FIG. 1 employs a client-server architecture, the present inventive subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

As shown, the network system 100 includes a client device 102 in communication with a data processing platform 104 over a network 106. The data processing platform 104 communicates and exchanges data with the client device 102 that pertains to various functions and aspects associated with the network system 100 and its users. Likewise, the client device 102, which may be any of a variety of types of devices that include at least a display, a processor, and communication capabilities that provide access to the network 106 (e.g., a smart phone, a tablet computer, a personal digital assistant (PDA), a personal navigation device (PND), a handheld computer, a desktop computer, a laptop or netbook, or a wearable computing device), may be operated by a user (e.g., a person) of the network system 100 to exchange data with the data processing platform 104 over the network 106.

The client device 102 communicates with the network 106 via a wired or wireless connection. For example, one or more portions of the network 106 may comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In various embodiments, the data exchanged between the client device 102 and the data processing platform 104 may involve user-selected functions available through one or more user interfaces (UIs). The UIs may be specifically associated with a web client 108 (e.g., a browser) or an application 109, executing on the client device 102, and in communication with the data processing platform 104.

Turning specifically to the data processing platform 104, a web server 110 is coupled to (e.g., via wired or wireless interfaces), and provides web interfaces to, an application server 112. The application server 112 hosts one or more applications (e.g., web applications) that allow users to use various functions and services of the data processing platform 104. For example, the application server 112 may host a manufacturing risk analytics service 114 that provides a number of analytics related to risk associated with product manufacturing (e.g., pharmaceutical drug manufacturing). In some embodiments, the manufacturing risk analytics service 114 runs and executes on the application server 112, while in other embodiments, the application server 112 provides the client device 102 with a set of instructions (e.g., computer-readable code) that causes the web client 108 of the client device 102 to execute and run the manufacturing risk analytics service 114. The manufacturing risk analytics service 114 analyzes various data to quantify the risk associated with a manufacturing facility and to provide stakeholders with a number of risk analytics to assist the stakeholders in tracking risk at their facilities. Further, the manufacturing risk analytics service 114 makes use of the determined risk analytics to assist stakeholders in anticipating risk based on projected changes in employment and manufacturing output.

The data analyzed by the manufacturing risk analytics service 114 may, for example, include operational data and deviation report data. The deviation report data includes deviation reports that describe a deviation from an existing manufacturing procedure (e.g., an approved instruction or an established standard). Each deviation report may include a timestamp (e.g., a time and date of the deviation), a textual description of the deviation, and a criticality category (e.g., incident, minor deviation, major deviation, critical deviation).

The operational data includes information related to staffing conditions of the manufacturing facility. For example, the operational data may include a total number of employees of the manufacturing facility, a total number of employees of the manufacturing facility who are temporary employees, a total cost to employ the employees of the manufacturing facility, a total number of hours worked by the employees of the manufacturing facility, and a total number of overtime hours worked by the employees of the manufacturing facility. The operational data also includes output data including an amount of goods produced by the employees of the manufacturing facility (e.g., represented as a dollar amount). The operational data also includes information related to customer complaints associated with the manufacturing facility, scheduled audits, previously performed audits, and task data including overdue, scheduled, and upcoming tasks. The operational data analyzed by the manufacturing risk analytics service 114 includes historical operational data (e.g., information related to staffing conditions over a previous period of time), current operational data (e.g., information related to current staffing conditions), and projected operational data (e.g., information related to anticipated staffing conditions).

The data analyzed by the manufacturing risk analytics service 114 is obtained from a third-party computing system 118 (e.g., corresponding to a manufacturing facility), and in particular, a third-party database 120 communicatively coupled to the third-party computing system 118. The data may be routinely automatically retrieved (e.g., nightly) by the manufacturing risk analytics service 114, or manually provided by a user of the third-party computing system 118 or the client device 102 for subsequent processing and analysis by the manufacturing risk analytics service 114.

The data obtained from the third-party computing system 118 is stored in a database 116 that is communicatively coupled to the application server 112 (e.g., via wired or wireless interfaces). The data processing platform 104 may further include a database server (not shown) that facilitates access to the database 116. The database 116 may include multiple databases that may be internal or external to the data processing platform 104. Data representative of the various risk analytics and other pertinent data generated by the manufacturing risk analytics service 114 are also stored on the database 116.

Figure 2:
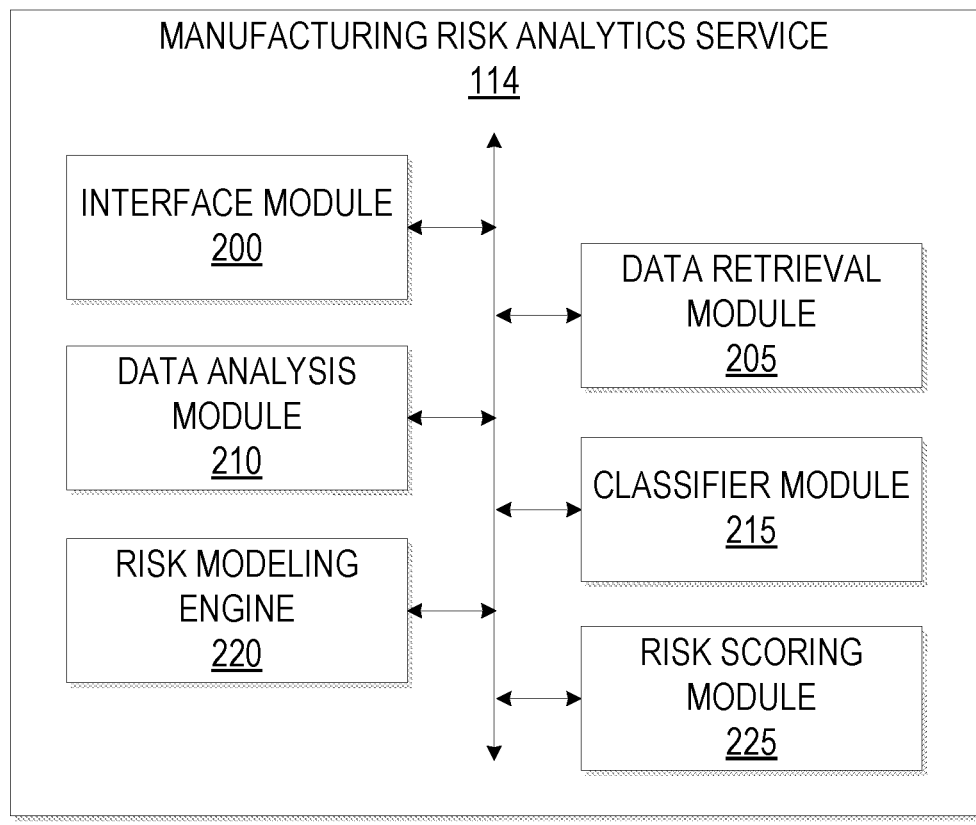
FIG. 2 is a block diagram illustrating various modules comprising a manufacturing risk analytics service, which is provided as part of the data processing platform, consistent with some embodiments.

FIG. 2 is a block diagram illustrating various modules comprising the manufacturing risk analytics service 114, which is provided as part of the data processing platform 104, consistent with some embodiments. As is understood by skilled artisans in the relevant computer and Internet-related arts, the modules and engines illustrated in FIG. 2 represent a set of executable software instructions and the corresponding hardware (e.g., memory and processor) for executing the instructions. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the manufacturing risk analytics service 114 to facilitate additional functionality that is not specifically described herein. Furthermore, the various functional modules and engines depicted in FIG. 2 may reside on a single computer (e.g., a client device), or may be distributed across several computers in various arrangements such as cloud-based architectures.

The manufacturing risk analytics service 114 is shown as including an interface module 200, a data retrieval module 205, a data analysis module 210, a classifier module 215, a risk modeling engine 220, and a risk scoring module 225, all configured to communicate with each other (e.g., via a bus, shared memory, a switch, or application programming interfaces (APIs)). The aforementioned modules of the manufacturing risk analytics service 114 may, furthermore, access one or more databases that are part of the data processing platform 104 (e.g., database 116), and each of the modules may access one or more computer-readable storage media of the client device 102.

The interface module 200 receives requests from various client computing devices, and communicates appropriate responses to the requesting client devices. The interface module 200 may receive requests from client devices in the form of Hypertext Transfer Protocol (HTTP) requests, or other web-based, application programming interface (API) requests. For example, the interface module 200 provides a number of interfaces (e.g., APIs or user interfaces that are presented by the client device 102) that allow data to be received by the manufacturing risk analytics service 114.

The interface module 200 also provides user interfaces that include graphical representations of the various analytics produced by the manufacturing risk analytics service 114. These user interfaces may include various graphs, charts, and other graphics used, for example, to represent and analyze risk associated with a manufacturing facility or a set of manufacturing facilities. The interface module 200 also receives and processes user input received through such user interfaces. Examples of the user interfaces provided by the interface module 200 are discussed below in reference to FIGS. 7-16.

The data retrieval module 205 is configured to retrieve data for processing and analysis. For example, the data retrieval module 205 obtains deviation report data and operational data associated with manufacturing facilities. In some embodiments, the data retrieval module 205 retrieves such data from the third-party database 120 of the third-party computing system 118 through appropriate requests (e.g., API requests or calls) transmitted over the network 106. The data may be retrieved by the data retrieval module 205 on a periodic basis (e.g., nightly). In some embodiments, the data retrieval module 205 obtains data from a location specified by a user (e.g., via a user interface provided by the interface module 200).

The data analysis module 210 is configured to analyze data to develop various analytics related to risk in a manufacturing facility. For example, the data analysis module 210 analyzes deviation report data to identify patterns in occurrences of deviations (e.g., departures from an existing manufacturing procedure). Given a set of deviation report data, the data analysis module 210 determines a number of analytics including a breakdown of the number of deviations that occur by type, subtype, root cause, work center, line-operations, product, and criticality, for example.

The data analysis module 210 also tracks the occurrences of deviations over time to identify chronic deviations. For example, the data analysis module 210 analyzes deviation report data to identify repeat deviations, which are multiple occurrences of the same deviation occurring within a predefined time range of one another. The data analysis module 210 includes classification logic that is used to classify deviations into groups so as to enable the data analysis module 210 to identify repeat deviations.

In some instances, the workload of employees at a manufacturing facility (e.g., a number of tasks assigned to each employee) contributes to the amount of risk at the manufacturing facility. Accordingly, the data analysis module 210 also analyzes task data (e.g., included as part of the operational data) obtained from a manufacturing facility to develop analytics to assist manufacturing facility stakeholders with task management and workload balancing. In some embodiments, the analysis of the task data may also be used in the determination of the amount of risk associated with manufacturing facilities.

The task data includes information related to planned and upcoming tasks associated with the manufacturing facility. The task data may include a scheduled date or date range, a due date, a responsible party (e.g., an employee of the manufacturing facility to whom the task is assigned), and a description of the task. The data analysis module 210 analyzes the task data to generate an overview of the tasks performed over a certain time period, and determine a number of overdue tasks, an amount of time each task is overdue, and a number of tasks scheduled for a given time period. The data analysis module 210 also generates a breakdown of tasks due by days overdue, due date, status, and criticality. The data analysis module 210 also generates a breakdown of the tasks assigned to each employee of the manufacturing facility and the status of each task (e.g., overdue, scheduled, and upcoming).

The classifier module 215 is configured to analyze the textual descriptions of deviations included in deviation report data to classify each deviation into one or more of several deviation types and subtypes. The deviation types and subtypes assigned to each deviation may be stored in a record associated with the corresponding deviation. In this manner, the data analysis module 210 can use the determined type and subtype to produce more informed analytics (e.g., a breakdown of deviations by type and subtype).

The risk modeling engine 220 is configured to generate risk data models for manufacturing facilities. A risk data model is used to quantify risk associated with the manufacturing facility. The risk data model includes one or more risk metrics, which are factors that contribute to risk. The one or more risk metrics may, for example, correspond to correlations between occurrences of deviations in a manufacturing facility and staffing conditions of the manufacturing facility. Accordingly, in generating the risk data model, the risk modeling engine 220 analyzes deviation report data and historical operational data to identify correlations between occurrences of deviations and staffing conditions, which are used as the risk metrics in the risk data model. For example, the risk metrics may include a headcount change (e.g., a number of employees hired over a period of time), a percentage of hours worked by employees that are overtime hours, a percentage of the total workforce who are temporary employees, and productivity (e.g., amount of goods created relative to an amount of people creating the goods). The risk data model also includes a weight of each risk metric to indicate an amount of risk attributable to that risk metric.

In some embodiments, the risk data model generated by the risk modeling engine 220 takes into account the output of (e.g., amount of goods produced by) the manufacturing facility. To this end, the risk modeling engine 220 analyzes deviation report data along with operational data to identify trends in occurrences of deviations relative to the output of the manufacturing facility. In this manner, the risk data model may be used to identify risk associated with an anticipated output of the manufacturing facility.

The risk scoring module 225 generates a risk score for a manufacturing facility using a risk data model generated by the risk modeling engine 220. The risk score provides a quantified measure of risk associated with the manufacturing facility. Specifically, in some instances, the risk score provides an indication of the likelihood that a future deviation will occur in the manufacturing facility.

In generating the risk score for a manufacturing facility, the risk scoring module 225 accesses a risk data model corresponding to the manufacturing facility, and operational data associated with the manufacturing facility. The operational data may include either current operational data (e.g., information related to current staffing conditions of the manufacturing facility) or projected operational data (e.g., information related to anticipated staffing conditions of the manufacturing facility). In instances in which the risk score is based on current operational data, the risk score provides an indication of the current risk associated with the manufacturing facility. In instances in which the risk score is based on projected operational data, the risk score provides an indication of the risk associated with the anticipated staffing conditions.

Once the risk scoring module 225 has accessed the risk data model and the operational data, the risk scoring module 225 determines a value for each risk metric (referred to herein as "risk metric values") included in the risk data model. The risk scoring module 225 determines the risk metric values based on the operational data. Following the example from above, the risk scoring module 225 determines values corresponding to headcount change, overtime hour percentage, temporary employee percentage, and productivity. The risk scoring module 225 then weights each determined risk metric value based on the respective risk metric weight indicated in the risk data model. The weighted risk metric values are used to provide an indication of the risk associated with each individual risk metric; accordingly, the risk scoring module 225 may work in conjunction with the interface module 200 to provide a display of the weighted risk metric values. To generate the overall risk score associated with the manufacturing facility, the risk scoring module 225 aggregates the weighted risk metric values. For example, the risk scoring module 225 calculates an average of the weighted risk metric values to generate the overall risk score.

The risk scoring module 225 also determines risk levels associated with manufacturing facilities based on the determined risk score. The risk level may, for example, be high, medium, or low. Each risk level corresponds to a range of risk scores, and accordingly, the determination of the risk level of a manufacturing facility includes determining which range of values the determined risk score falls into.

In some embodiments, the risk scoring module 225 also calculates a risk score specifically associated with a production target of the manufacturing facility. The production target includes a recovery amount (e.g., an anticipated amount of goods to be produced or output). Production target data representative of the production target may be included in the operational data associated with the manufacturing facility, or provided by a user through an interface provided by the interface module 200. The risk scoring module 225 uses the risk data model along with operational data associated with the manufacturing facility to calculate the risk level associated with the production target.

Figure 3:
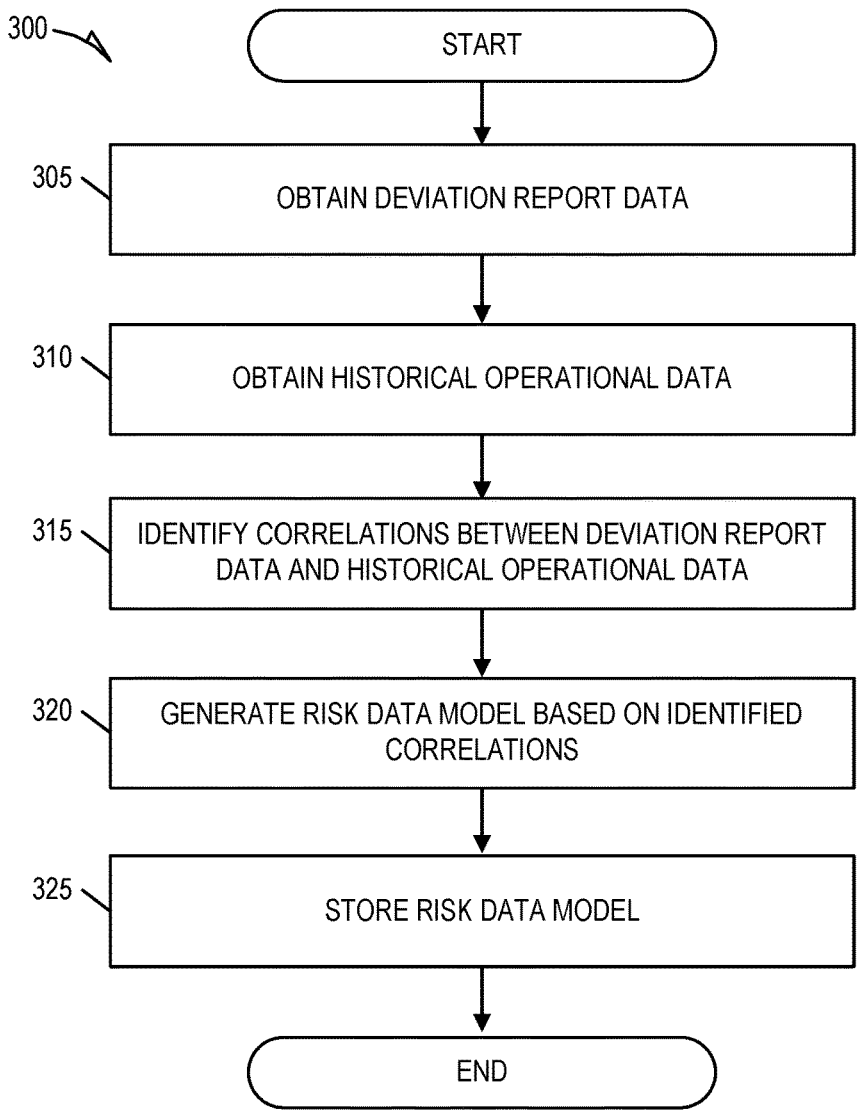
FIG. 3 is a flowchart illustrating a method for generating a risk data model associated with a manufacturing facility, consistent with some embodiments.

FIG. 3 is a flowchart illustrating a method 300 for generating a risk data model for a manufacturing facility, consistent with some embodiments. The method 300 may be embodied in computer-readable instructions for execution by one or more processors such that the operations of the method 300 may be performed in part or in whole by the application server 112. In particular, the operations of the method 300 may be performed in part or in whole by the manufacturing risk analytics service 114; accordingly, the method 300 is described below by way of example with reference thereto. However, it shall be appreciated that at least some of the operations of the method 300 may be deployed on various other hardware configurations and the method 300 is not intended to be limited to the application server 112 or the manufacturing risk analytics service 114.

At operation 305, the risk modeling engine 220 obtains deviation report data associated with a manufacturing facility. The deviation report data includes one or more deviation reports identifying a deviation from a manufacturing procedure (e.g., an established standard or approved instruction). Each deviation report includes a timestamp, a criticality category, and a textual description of the deviation. An example of a deviation is placing an incorrect label on a product.

At operation 310, the risk modeling engine 220 obtains historical operational data associated with the manufacturing facility. The historical operational data includes information related to staffing conditions of the manufacturing facility over a previous period of time. The historical operational data may, for example, include a total number of employees of the manufacturing facility, a total number of employees of the manufacturing facility who are temporary employees, a total cost to employ the employees of the manufacturing facility, an amount of goods created by the employees of the manufacturing facility, a total number of hours worked by the employees of the manufacturing facility, and a total number of overtime hours worked by the employees of the manufacturing facility.

At operation 315, the risk modeling engine 220 identifies correlations between the deviation report data and the historical operational data. Specifically, the risk modeling engine 220 identifies correlations between occurrences of deviations and staffing conditions. In some instances, the risk modeling engine 220 may identify a series of non-linear exponential correlated risk factors. The identification of the correlations between the deviation report data and the historical operational data results in the identification of factors that contribute to risk in the manufacturing facility, and the degree to which each factor contributes to the risk.

Figure 4:
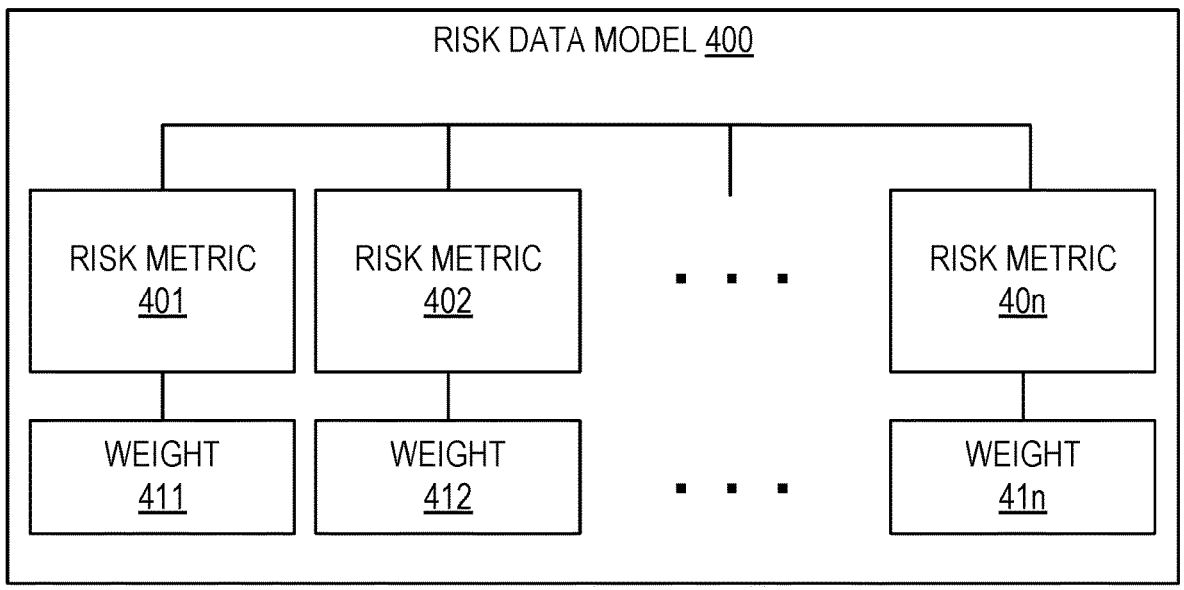
FIG. 4 is a block diagram illustrating a risk data model, consistent with some embodiments.

At operation 320, the risk modeling engine 220 generates a risk data model corresponding to the manufacturing facility using the identified correlations. In particular, the risk data model includes one or more risk metrics (e.g., factors contributing to risk) corresponding to the identified correlations. As an example, FIG. 4 is a block diagram illustrating an example risk data model 400, consistent with some embodiments. As shown, the risk data model 400 includes risk metrics 401-40n, each of which is a factor that contributes to the overall risk of the manufacturing facility. In some embodiments, the risk metrics 401-40n correspond to correlations between deviation report data and operational data associated with the manufacturing facility. The risk metrics 401-40n may, in some embodiments, also relate to financial risks (e.g., risk of financial issues affecting the manufacturing site), manufacturing risk (e.g., risk of manufacturing problems such as those caused by legacy systems), risks associated with excipients (e.g., risk of input materials and chemicals causing a problem), risks associated with change control (e.g., risk associated with change control events such as new processes or procedures, or failure to adhere to existing ones), and risk associated with mother nature (e.g., lightning storms, high humidity, high or low temperatures, or the like), for example. As shown, the risk data model 400 also includes weights 411-41n, each of which corresponds to a respective risk metric 401-40n, and indicates a degree to which the respective risk metric 401-40n contributes to the overall risk of the manufacturing facility.

Referring back to FIG. 3, at operation 325, the risk modeling engine 220 stores the risk data model in the database 116 for subsequent retrieval. The risk data model may be indexed according to, or otherwise associated with, an identifier of the manufacturing facility such that the risk data model may be subsequently retrieved for use in calculating risk scores specifically associated with the manufacturing facility.

Figure 5:
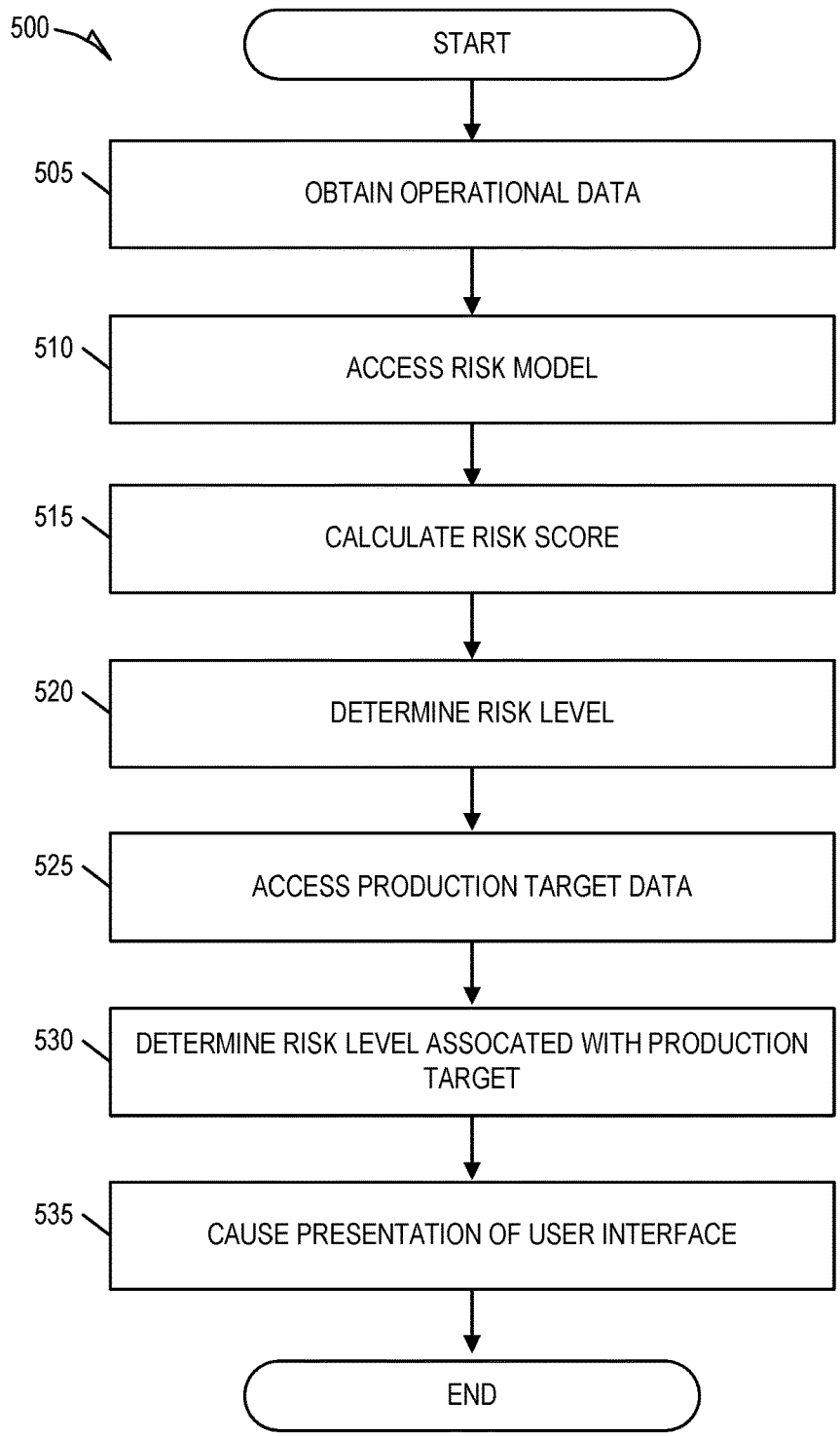
FIG. 5 is a flowchart illustrating a method for determining risk associated with a manufacturing facility, according to some embodiments.

FIG. 5 is a flowchart illustrating a method 500 for determining risk associated with a manufacturing facility, according to some embodiments. The method 500 may be embodied in computer-readable instructions for execution by one or more processors such that the operations of the method 500 may be performed in part or in whole by the application server 112. In particular, the operations of the method 500 may be performed in part or in whole by the manufacturing risk analytics service 114; accordingly, the method 500 is described below by way of example with reference thereto. However, it shall be appreciated that at least some of the operations of the method 500 may be deployed on various other hardware configurations and the method 500 is not intended to be limited to the application server 112 or the manufacturing risk analytics service 114.

At operation 505, the interface module 200 obtains operational data associated with a manufacturing facility. The operational data includes information related to staffing conditions of the manufacturing facility. The operational data may relate to current or projected staffing conditions. The interface module 200 may receive the operational data from a user via one or more user interfaces, or the data retrieval module 205 may provision the interface module 200 with the operational data after retrieving it from one or more third party sources.

At operation 510, the risk scoring module 225 accesses a risk data model corresponding to the manufacturing facility (e.g., from the database 116). The risk data model includes risk metrics that contribute to the overall risk of the manufacturing facility.

Figure 6:
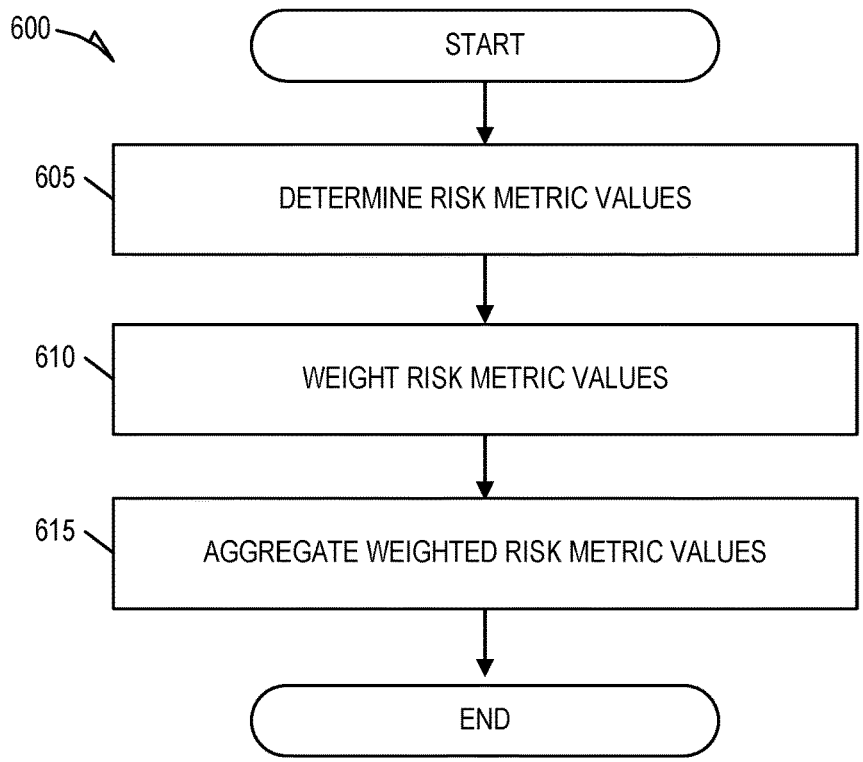
FIG. 6 is a flowchart illustrating a method for calculating a risk score associated with a manufacturing facility, according to some embodiments.

At operation 515, the risk scoring module 225 calculates, using the risk data model, a risk score for the manufacturing facility based on the operational data received at operation 505. As an example, FIG. 6 is a flowchart illustrating a method 600 for calculating a risk score associated with a manufacturing facility, according to some embodiments. Consistent with some embodiments, the method 600 may correspond to operation 515 of the method 500.

The method 600 may be embodied in computer-readable instructions for execution by one or more processors such that the operations of the method 600 may be performed in part or in whole by the application server 112. In particular, the operations of the method 600 may be performed in part or in whole by the functional components of the manufacturing risk analytics service 114; accordingly, the method 600 is described below by way of example with reference thereto. However, it shall be appreciated that at least some of the operations of the method 600 may be deployed on various other hardware configurations and the method 600 is not intended to be limited to the application server 112.

At operation 605, the risk scoring module 225 determines risk metric values for each of the risk metrics included in the risk data model of the manufacturing facility based on the operational data. At operation 610, the risk scoring module 225 weights each risk metric value according to the respective weight of each risk metric specified by the risk data model. At operation 615, the risk scoring module 225 aggregates the weighted risk metric values to generate the risk score for the manufacturing facility. For example, the risk scoring module 225 may calculate the average of the weighted risk metric values to determine the overall risk score for the manufacturing facility.

Referring back to FIG. 5, at operation 520, the risk scoring module 225 determines a risk level of the manufacturing facility based on the risk score. The risk scoring module 225 determines the risk level based on the range of risk scores the risk score determined in operation 515 falls into. The risk level may, for example, be high, medium, or low.

At operation 525, which is optional in some embodiments, the risk scoring module 225 accesses production target data including a production target (e.g., an anticipated recovery). The production target data may be included in the operational data associated with the manufacturing facility or it may be received directly from a user via a user interface provided by the interface module 200.

At operation 530, which is optional in some embodiments, the risk scoring module 225 determines a risk level associated with the production target using the risk data model and the determined risk metric values. The risk scoring module 225 may determine the risk level associated with the production target based on a comparison of risk scores associated with the manufacturing facility at previous production (e.g., recovery) levels.

Figure 7:
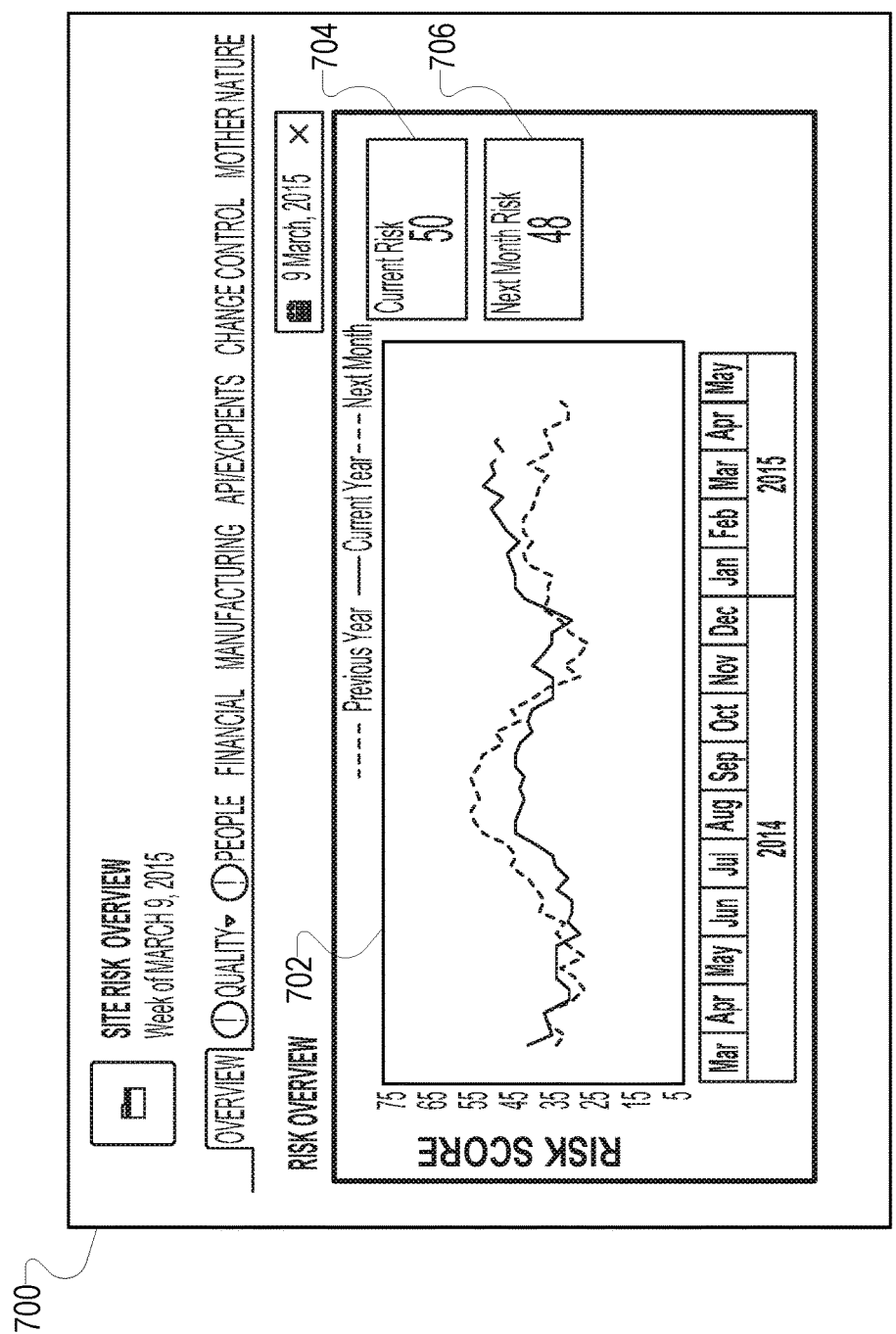
FIG. 7 is an interface diagram illustrating a user interface for providing an overview of risk associated with a manufacturing facility, according to example embodiments.

At operation 535, the interface module 200 causes presentation of a user interface on the client device 102. The user interface includes the risk score and the risk level associated with the manufacturing facility along with other information such as the risk level associated with a production target. As an example of the foregoing user interface, FIG. 7 is an interface diagram illustrating a user interface 700 for providing an overview of the risk associated with a manufacturing facility, according to example embodiments.

As shown, the user interface 700 includes a graph 702 that illustrates risk scores associated with a manufacturing facility over a period of time, which in this example relate to deviations occurring over the period of time. The graph 702 includes the risk scores for both a previous and a current year. It shall be appreciated that a year is simply an example time period over which risk scores may be graphed, although, in other embodiments, a user may specific other time period for the graph 702.

In some instances, the method 500 may initially be performed for current operational data and then repeated for projected operational data to produce a current risk score and a projected risk score. That is, a risk score is initially calculated based on the current operational data, and then the risk score is recalculated based on the projected operational data. An example of the current and projected risk scores is included in the user interface 700. In particular, a window 704 includes a current risk score, and a window 706 includes a projected risk score for the next month.

Figure 8:
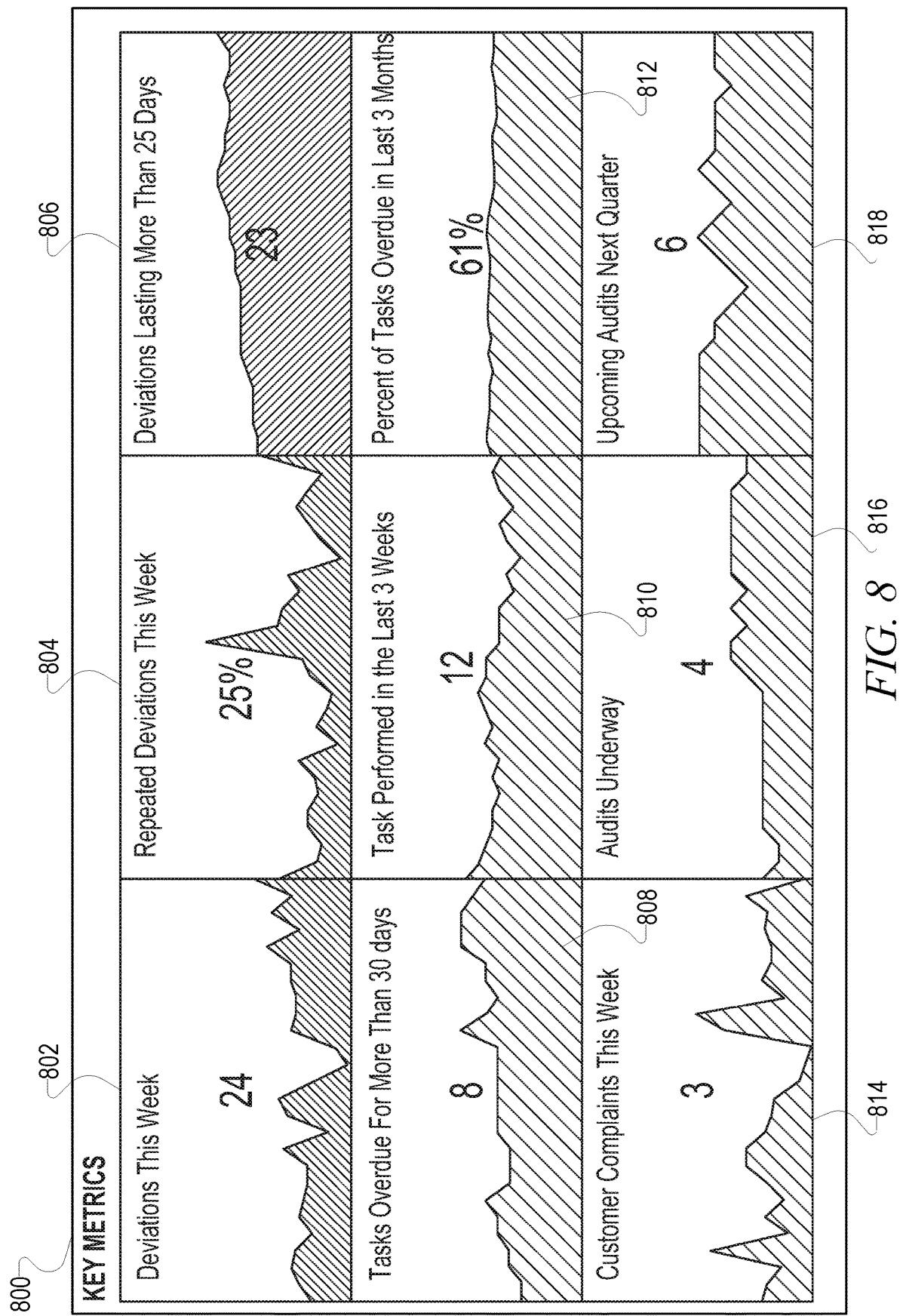
FIG. 8 is an interface diagram illustrating a user interface for providing an overview of risk associated with a manufacturing facility, according to alternative example embodiments.

Further examples of interfaces provided by the interface module 200 are discussed below in reference to FIGS. 8-16. FIG. 8, for example, is an interface diagram illustrating a user interface 800 for providing an overview of the risk associated with a manufacturing facility, according to an alternative example. As shown, the user interface 800 includes a number of risk analytics associated with the manufacturing facility. The risk analytics represented in the user interface 800 are developed by the data analysis module 210 through an analysis of deviation report data and operational data associated with the manufacturing facility.

In particular, the user interface 800 includes risk analytics associated with deviations occurring at the manufacturing facility, such as weekly deviations 802, repeat deviations 804 (e.g., multiple instances of the same deviation occurring within a predefined time range), and past due deviations 806 (e.g., deviations awaiting corrective action). The user interface 800 also includes risk analytics associated with tasks performed at the manufacturing facility, such as overdue tasks 808, tasks performed 810, and percent of tasks overdue 812. The user interface 800 also includes risk analytics associated with manufacturing audits, such as customer complaints 814, audits underway 816, and upcoming audits 818.

Figure 9:
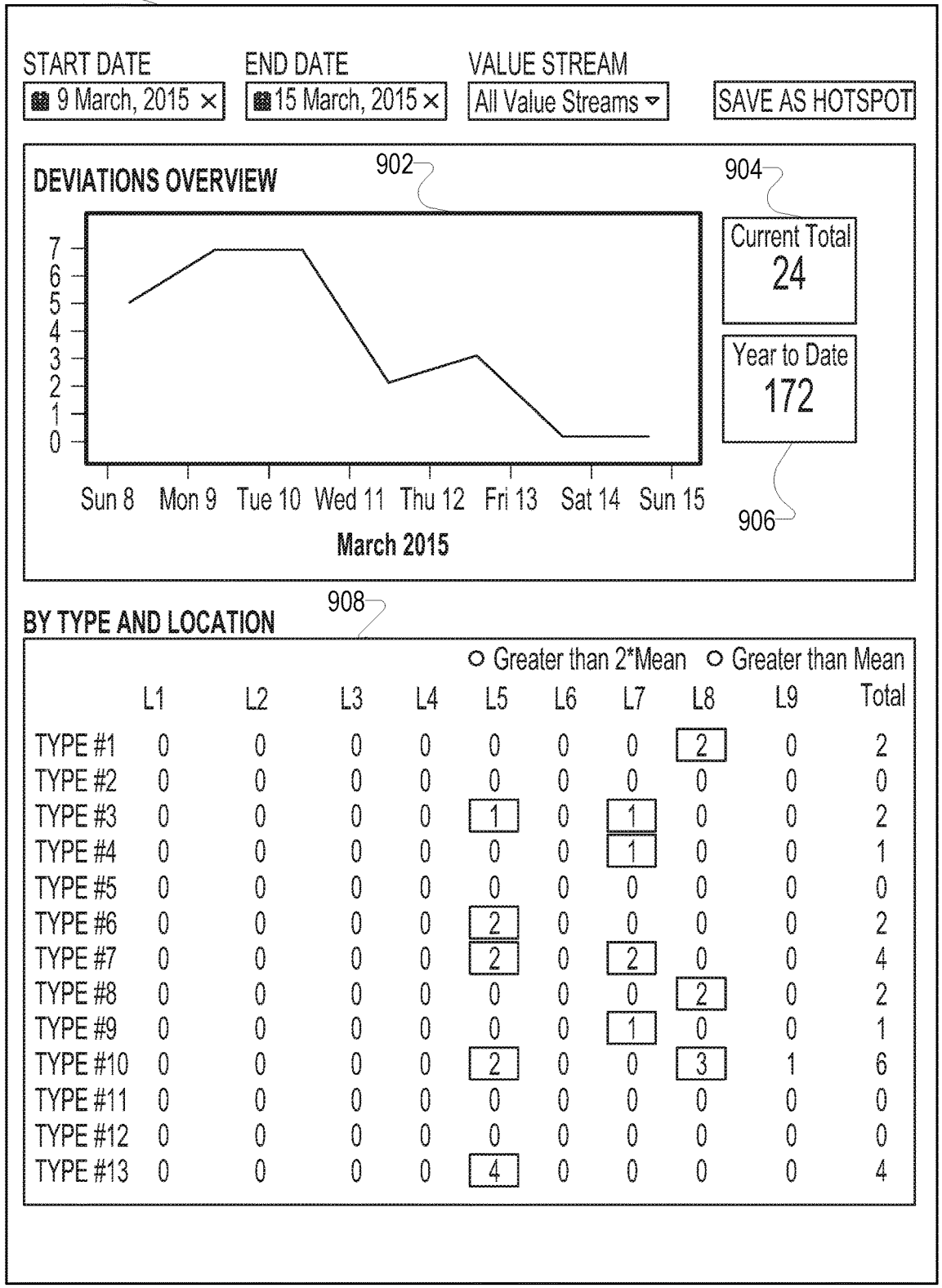
FIG. 9 is an interface diagram illustrating a user interface for providing an overview of deviations occurring at a manufacturing facility, according to example embodiments.

FIG. 9 is an interface diagram illustrating a user interface 900 for providing an overview of deviations occurring at a manufacturing facility, according to example embodiments. The information presented in the user interface 900 is developed by the data analysis module 210 based on an analysis of deviation report data and operational data associated with the manufacturing facility. As shown, the user interface 900 includes a graph 902 that illustrates deviations that have occurred at the manufacturing facility over a period of time. The user interface 900 also includes a window 904 displaying a total count of current deviations, and a window 906 displaying a year-to-date count of deviations. The user interface 900 also includes a table 908 showing a count of deviations occurring by type and location. The location of a deviation refers to the location within the manufacturing facility where the deviation occurred (e.g., a particular product line or work center).

Figure 10:
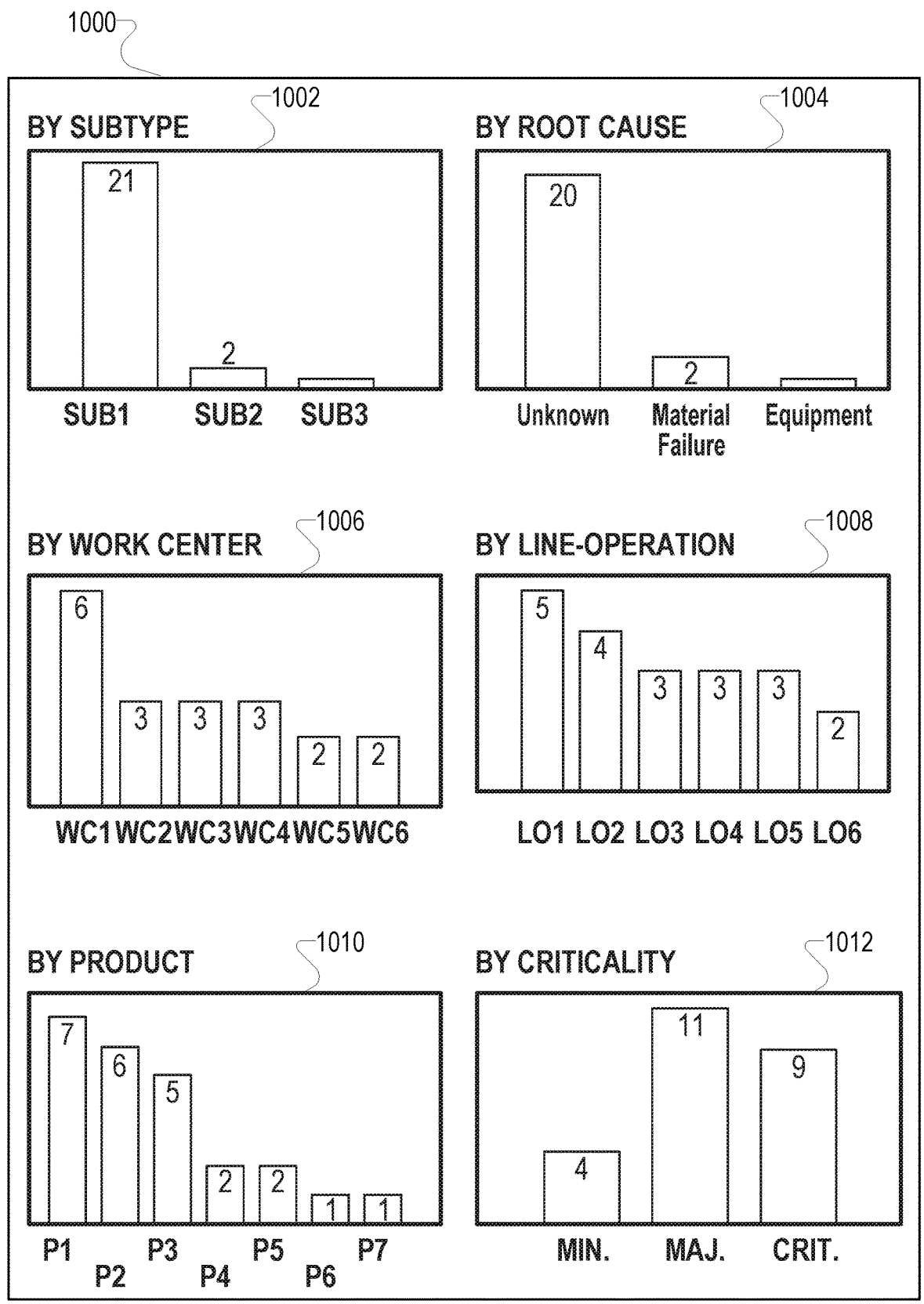
FIG. 10 is an interface diagram illustrating a user interface for providing a detailed breakdown of deviations occurring at a manufacturing facility, according to example embodiments.

FIG. 10 is an interface diagram illustrating a user interface 1000 for providing a detailed breakdown of deviations occurring at a manufacturing facility, according to example embodiments. The information presented in the user interface 1000 is developed by the data analysis module 210 based on an analysis of deviation report data and operational data associated with the manufacturing facility. As shown, the user interface 1000 includes multiple charts displaying a number of deviations occurring in the manufacturing facility by subtype 1002, root cause 1004, work center 1006, line-operation 1008, product 1010, and criticality 1020.

Figure 11:
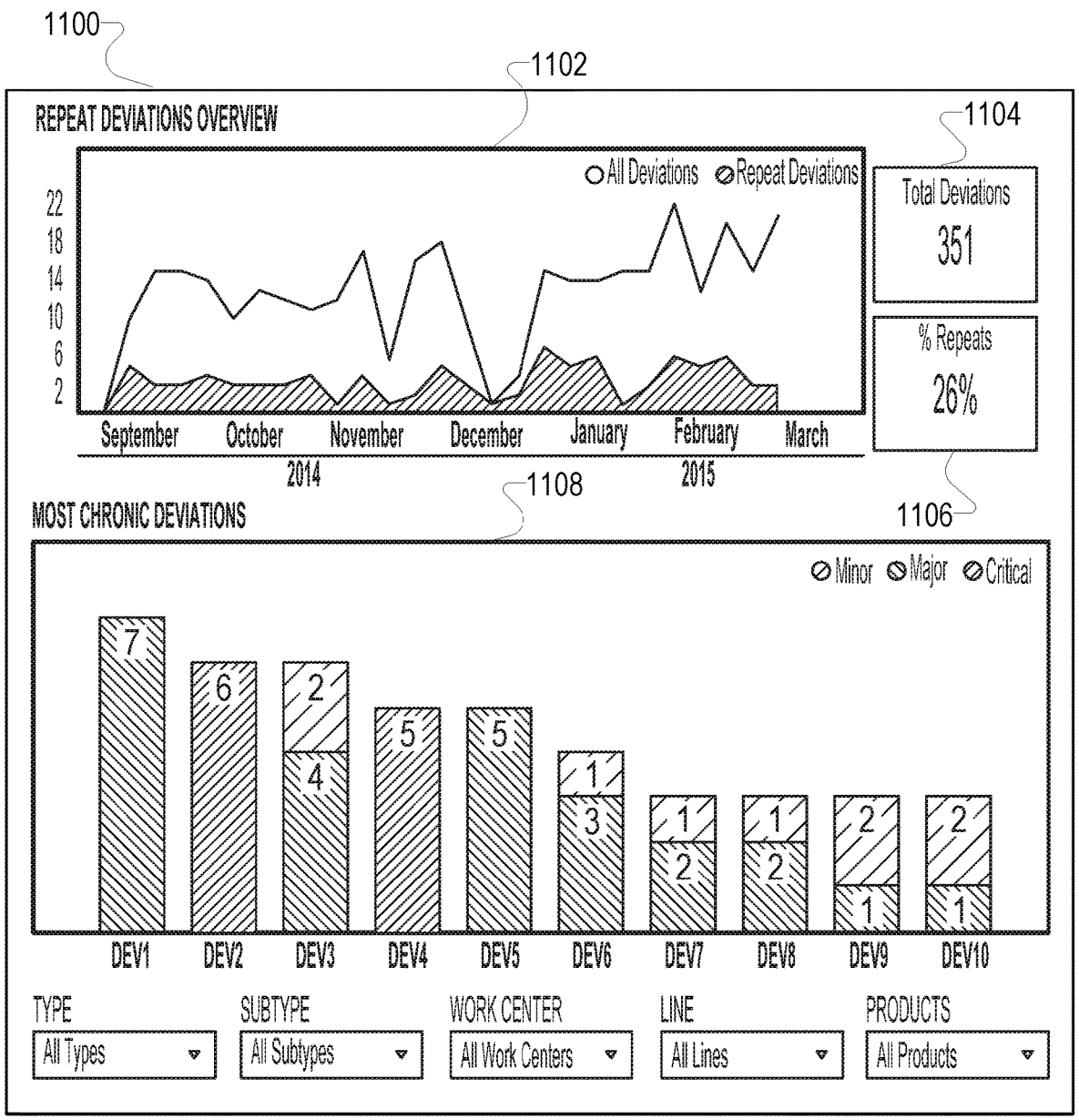
FIG. 11 is an interface diagram illustrating a user interface for presenting information related to chronic deviations in a manufacturing facility, according to example embodiments.

FIG. 11 is an interface diagram illustrating a user interface 1100 for presenting information related to chronic deviations in a manufacturing facility, according to example embodiments. The information presented in the user interface 1100 is developed by the data analysis module 210 based on an analysis of deviation report data and operational data associated with the manufacturing facility. As shown, the user interface 1100 includes a graph 1102 illustrating deviations occurring at the manufacturing facility over a period of time, along with repeat deviations occurring at the manufacturing facility over the same period of time. The user interface 1100 also includes a window 1104 displaying the total number of deviations over the period of time, and a window 1106 displaying the percentage of the deviations that are repeat deviations. The user interface 1100 also includes a chart 1108 displaying a breakdown of repeat deviations by type. The chart 1108 includes a display of the number of each type of deviation that are repeat deviations. The chart 1108 also includes indicators (e.g., colors) of criticality (e.g., minor, major, critical) for each repeat deviation.

Figure 12:
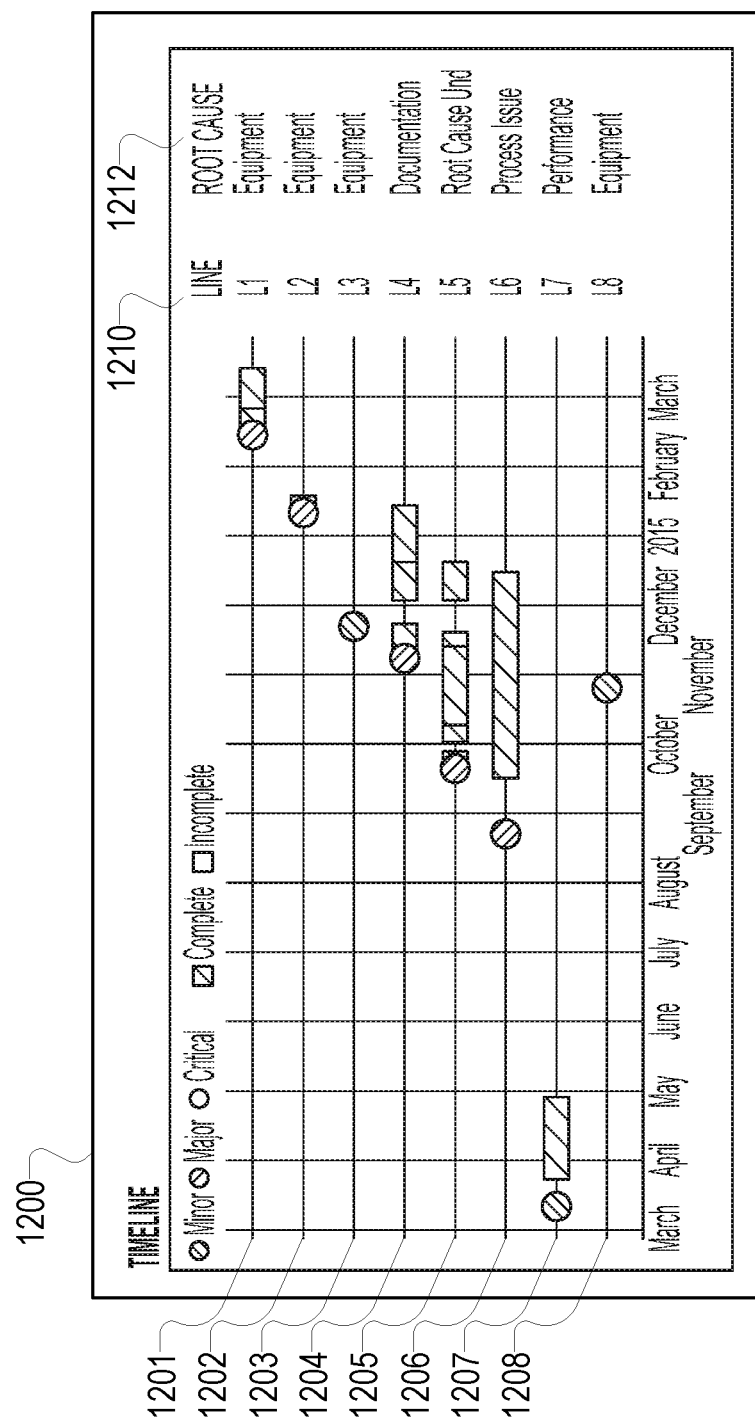
FIG. 12 is an interface diagram illustrating a user interface for presenting deviation timelines, according to example embodiments.

FIG. 12 is an interface diagram illustrating a user interface 1200 for presenting deviation timelines, according to example embodiments. The information presented in the user interface 1200 is developed by the data analysis module 210 based on an analysis of deviation report data and operational data associated with a manufacturing facility. As shown, the user interface 1200 includes timelines 1201-1208, each of which corresponds to a repeat deviation. The user interface 1200 also indicates a line 1210 (e.g., manufacturing procedure) from which each repeat deviation originated and a root cause 1212 corresponding to each of the timelines 1201-1208. Each of the timelines 1201-1208 further includes an indicator (e.g., a rectangle) of remediation actions taken to remedy the deviations along with an indication of the status (e.g., complete or incomplete) of the remediation action. For example, rectangles are used in the user interface 1200 to denote remediation actions, and the color of each rectangle is used to denote the status of the corresponding remediation action. Further, the duration of each of the remediation actions is denoted by the length of the corresponding rectangle. Each of the timelines 1201-1208 also includes an indicator (e.g., colored circle) of criticality (e.g., minor, major, critical) for the corresponding repeat deviation.

Figure 13:
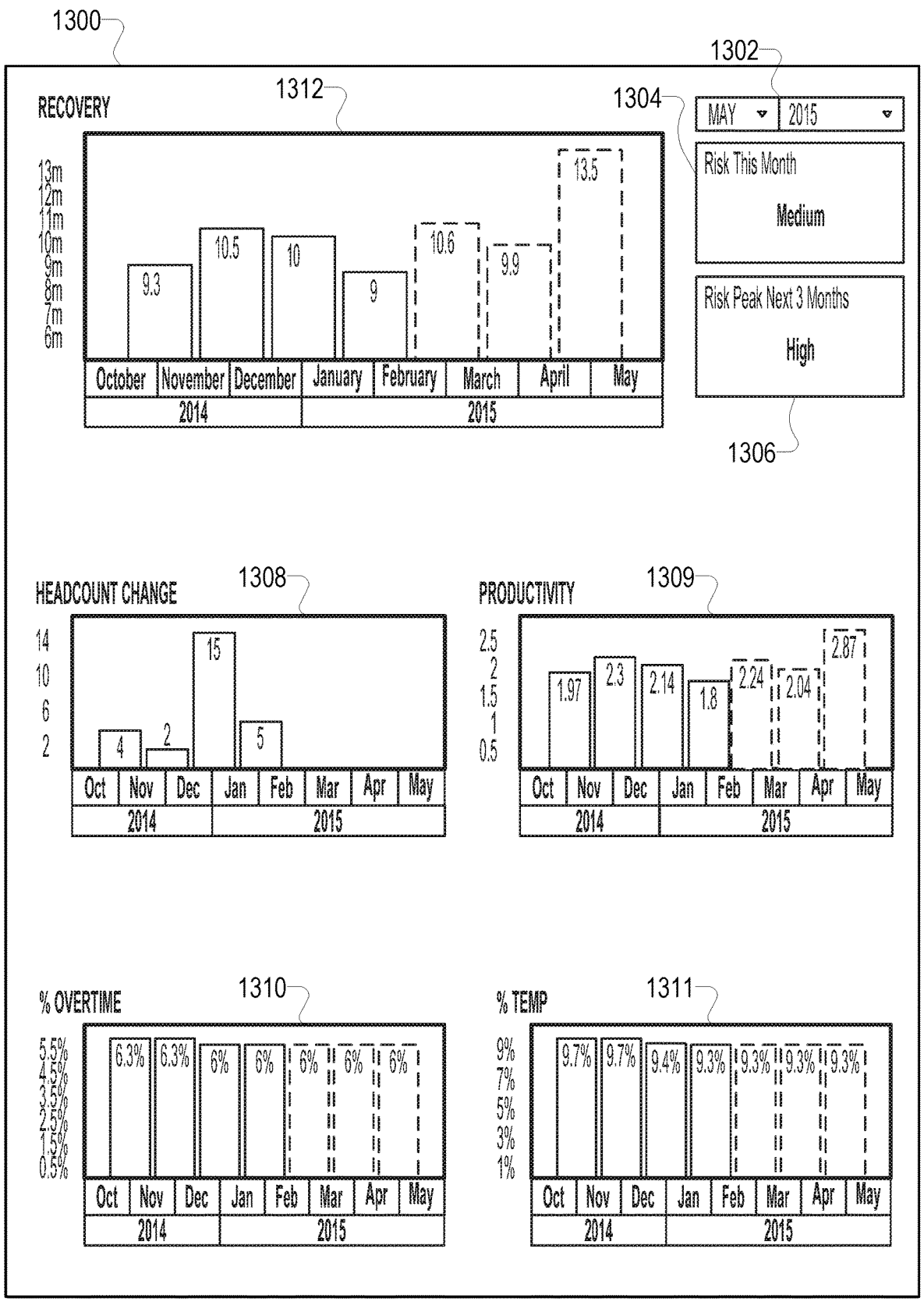
FIG. 13 is an interface diagram illustrating a user interface for presenting risk analytics related to staffing conditions, according to example embodiments.

FIG. 13 is an interface diagram illustrating a user interface 1300 for presenting risk analytics related to staffing conditions, according to example embodiments. As shown, the user interface 1300 includes staffing-related risk analytics over a specified time period. A user may specify the time period of analysis using date drop-down menus 1302. As shown, the user interface 1300 includes a window 1304 for displaying a current risk level (e.g., high, medium, or low) and a window 1306 for displaying a projected risk level, which in this example corresponds to the peak risk level for the next three months.

The risk levels displayed in the windows 1304 and 1306 are determined by the risk scoring module 225 based on an analysis of operational data (historical, current, and projected) in light of various risk metrics included in a risk data model corresponding to a manufacturing facility. In this example, the risk metrics relate to staffing conditions of the manufacturing facility. In particular, in this example, the risk metrics include headcount change, productivity, percent overtime, and percent temporary employees. As shown, the user interface 1300 includes charts 1308-1311, each of which corresponds to a risk metric included in the risk data model. In particular, each of the charts 1308-1311 includes historical, current, and projected risk metric values for the corresponding risk metric over the period of time specified by the date drop-down menus 1302. The risk metric values are determined by the risk scoring module 225 based on analysis of the manufacturing facility's operational data. Each of the charts 1308-1311 also includes an indicator of the risk level associated with the corresponding risk metric value, which is denoted by color. The risk level of each risk metric value corresponds to the weighted risk metric value determined during the process of calculating a risk score associated with the manufacturing facility.

As an example, the chart 1308 includes historical, current, and projected values for headcount change, which represents the change to the total number of employees of the manufacturing facility, over the period of time specified by the date drop-down menus 1302. The chart 1309 includes historical, current, and projected values for productivity, which represents an amount of goods created at the manufacturing facility relative to the amount of people creating the goods, over the period of time specified by the date drop-down menus 1302. The chart 1310 includes historical, current, and projected values for percent overtime, which represents an amount of overtime hours worked at the manufacturing facility relative to the total number of hours worked at the manufacturing facility, over the period of time specified by the date drop-down menus 1302. The chart 1311 includes historical, current, and projected values for percent temporary employees, which represents a number of temporary employees of the manufacturing facility relative to the total number of employees in the manufacturing facility workforce, over the period of time specified by the date drop-down menus 1302.

The user interface 1300 also includes a chart 1312 illustrating historical, current, and projected values for recovery of the manufacturing facility over the period of time specified by the date drop-down menus 1302. The recovery of the manufacturing facility represents an amount of goods being created (e.g., amount in dollars of revenue generated) by the manufacturing facility. The chart 1312 also includes an indicator of risk level for each recovery value. The risk scoring module 225 determines the risk level associated with each historical, current, and projected recovery value based on an analysis of the manufacturing facility's operational data in light of the risk data model associated with the manufacturing facility.

FIG. 14 is an interface diagram illustrating a user interface 1400 for presenting risk analytics associated with future projections, according to example embodiments. As shown, the user interface 1400 includes buttons 1402 and 1404 for receiving user input indicative of projected operational data of a manufacturing facility. In particular, the buttons 1402 and 1404 are used to specify projected operational data that may have an effect on one or more risk metrics included in a risk data model corresponding to the manufacturing facility. More specifically, in this example, the button 1402 may be used to input a projected value for a number of temporary employees who will be converted into full-time employees, and the button 1404 may be used to input a projected value for a number of new hires who are temporary employees.

Inputs received at either of the buttons 1402 and 1404 may change one or more risk metric values, and thus, change not only the projected overall risk score, but the individual risk levels associated with each risk metric as well. Accordingly, upon receiving inputs at either one of the buttons 1402 or 1404 indicative of projected operational data, the risk scoring module 225 recalculates risk levels for at least a portion of the risk metrics in the risk data model, and the recalculated risk levels are displayed in the user interface 1400. In particular, the risk scoring module 225 recalculates risk levels for a set of risk metric pairs (e.g., overtime and headcount) in light of the input received via the buttons 1402 and 1404. The risk level for each risk metric pair is displayed in the user interface 1400 in a different block so as to illustrate the relationship of each risk metric pair. For example, a block 1406 represents a +5% change in overtime hours and a −5% change in headcount. Similarly, a block 1408 represents a −7% change in overtime hours and a +5% change in headcount. In the user interface 1400, the risk level of each block is denoted by color. It shall be appreciated that although FIG. 14 illustrates only change in overtime hours and change in headcount, the user interface 1400 is not limited to these risk metrics, and other risk metrics may be used in other embodiments.

Figure 15:
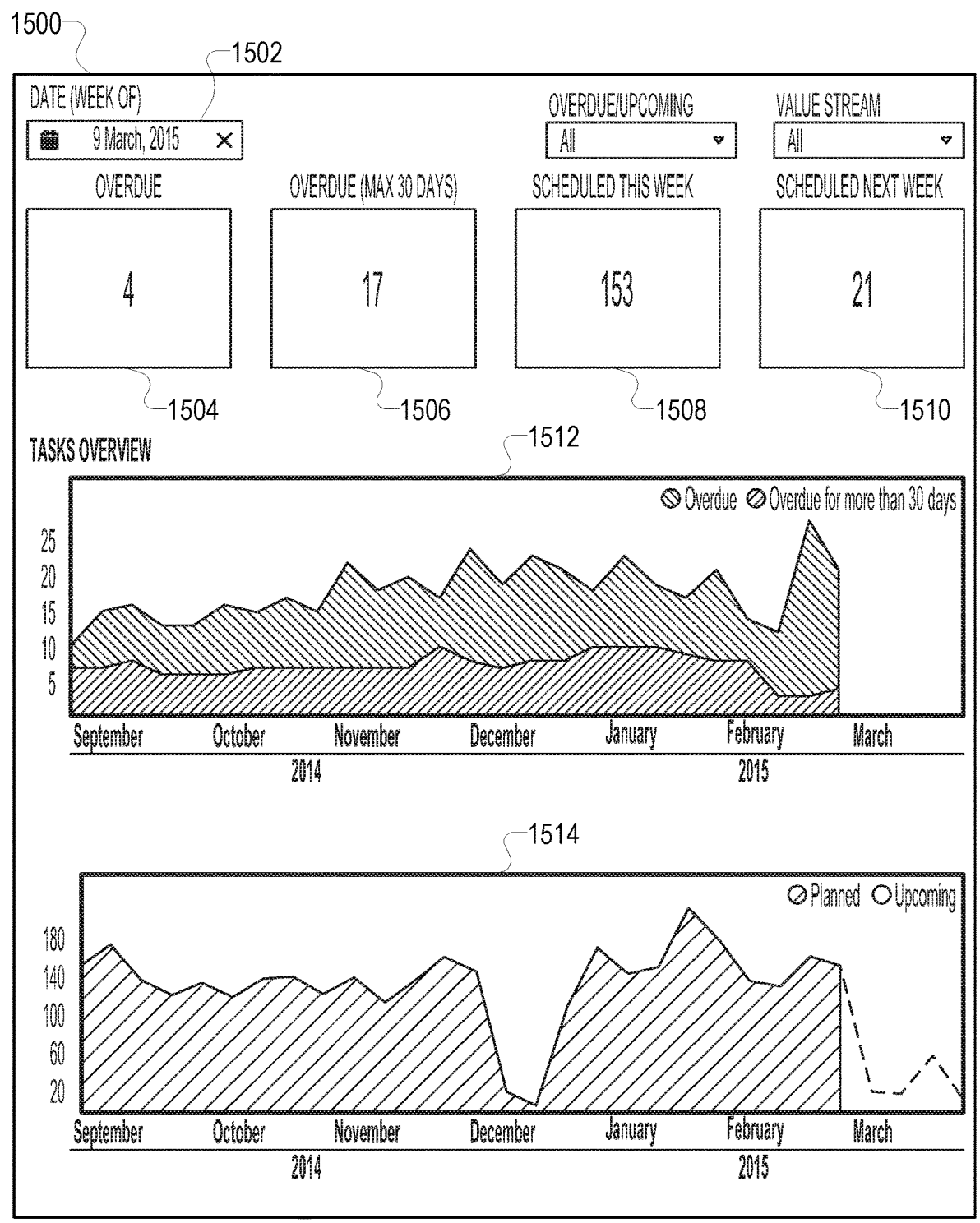
FIG. 15 is an interface diagram illustrating a user interface for presenting an overview of tasks associated with a manufacturing facility, according to example embodiments.

FIG. 15 is an interface diagram illustrating a user interface 1500 for presenting an overview of tasks associated with a manufacturing facility, according to example embodiments. The information presented in the user interface 1500 is developed by the data analysis module 210 based on an analysis of task data included as part of operational data associated with the manufacturing facility. As shown, the user interface 1500 includes a drop-down menu 1502 that allows a user to input a date for inspection. The user interface 1500 includes a window 1504 that displays a number of overdue tasks, a window 1506 that displays a number of tasks that are overdue beyond a threshold period of time (e.g., past 30 days), a window 1508 that displays a number of tasks due during the period of time, and a window 1510 that displays a number of tasks due during an upcoming period of time.

The user interface 1500 further includes a graph 1512 that displays overdue tasks over the period of time. The user interface 1500 further includes a graph 1514 that displays planned and upcoming tasks over the period of time.

Figure 16:
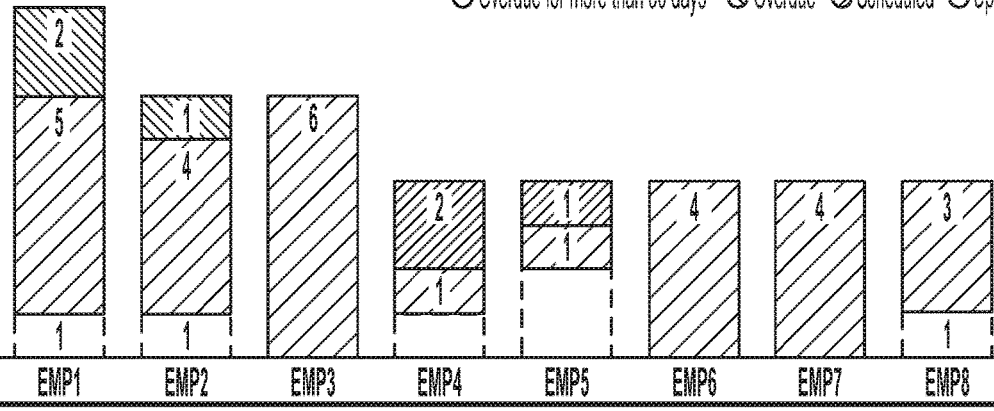
FIG. 16 is an interface diagram illustrating a user interface for presenting a detailed breakdown of tasks associated with a manufacturing facility, according to example embodiments.

FIG. 16 is an interface diagram illustrating a user interface 1600 for presenting a detailed breakdown of tasks associated with a manufacturing facility, according to example embodiments. The information presented in the user interface 1600 is developed by the data analysis module 210 based on an analysis of task data included as part of operational data associated with the manufacturing facility. As shown, the user interface 1600 includes charts 1602-1606 for displaying task-related information. In particular, the chart 1602 shows number of tasks by owner (e.g., an employee assigned to complete the task), the chart 1603 shows number of tasks by days overdue, the chart 1604 shows number of tasks by due date, the chart 1605 shows number of tasks by status, and the chart 1606 shows number of tasks by criticality. The charts 1602, 1605, and 1606 further include indicators of task status (e.g., overdue for more than 30 days, overdue, scheduled, and upcoming) as denoted by color.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable

Figure 17:
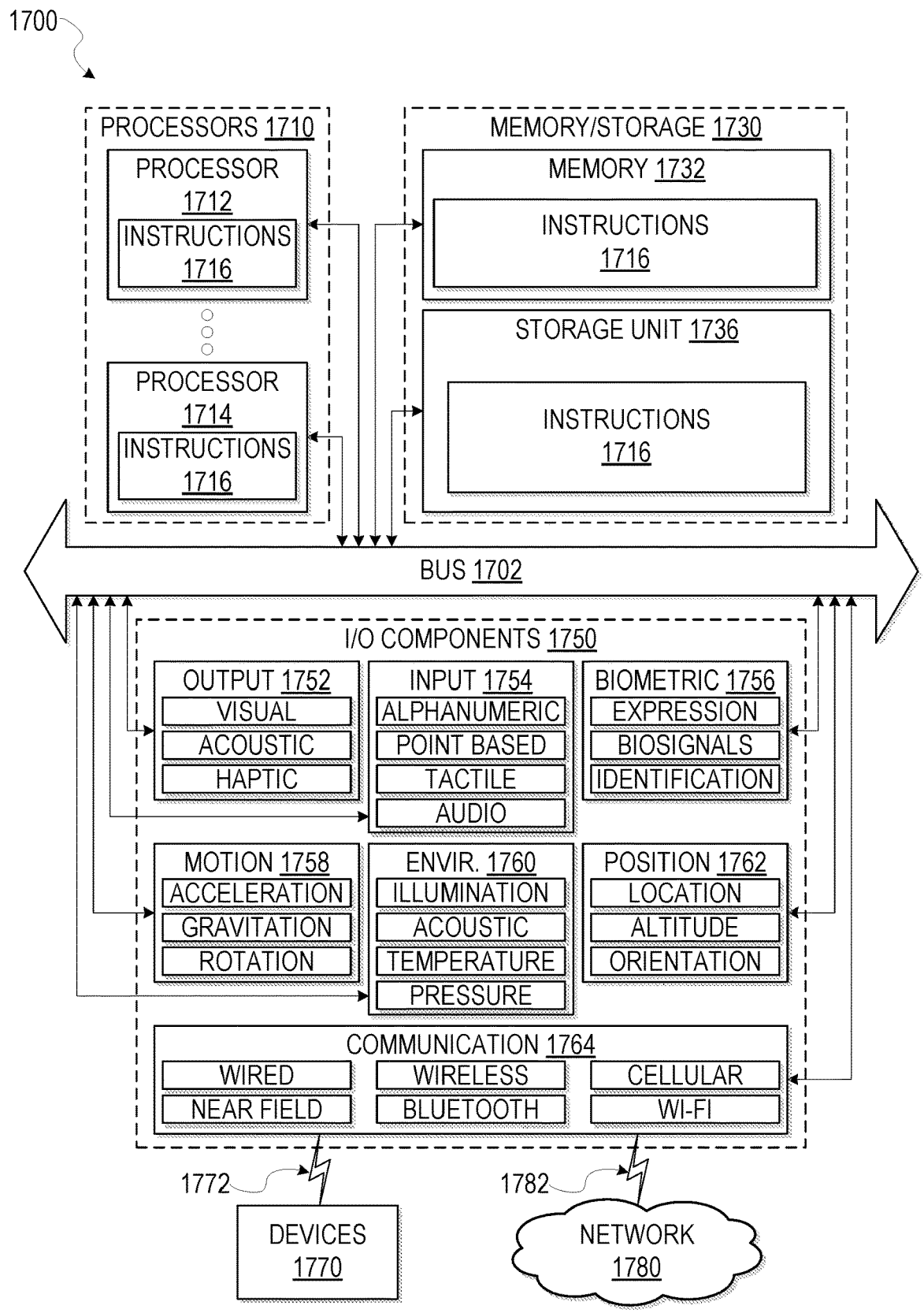
FIG. 17 is a diagrammatic representation of a machine in the example form of a computer system within which a set of instructions for causing the machine to perform any one or more of the methodologies discussed herein may be executed.

FIG. 17 is a block diagram illustrating components of a machine 1700, according to some example embodiments, able to read instructions from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1716 (e.g., software, a program, an application, an applet, an app, or other executable code) for causing the machine 1700 to perform any one or more of the methodologies discussed herein may be executed. Additionally, or alternatively, the machine 1700 may correspond to any one of the client device 102, the web server 110, the application server 112, or the third-party computing system 118. The instructions transform the general, non-programmed machine into a particular machine programmed to carry out the described and illustrated functions in the manner described. In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines 1700 that individually or jointly execute the instructions 1716 to perform any one or more of the methodologies discussed herein.

The machine 1700 may include processors 1710, memory/storage 1730, and I/O components 1750, which may be configured to communicate with each other such as via a bus 1702. In an example embodiment, the processors 1710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1712 and a processor 1714 that may execute the instructions 1716. The term "processor" is intended to include multi-core processor that may comprise two or more independent processors (sometimes referred to as "cores") that may execute instructions contemporaneously. Although FIG. 17 shows multiple processors, the machine 1700 may include a single processor with a single core, a single processor with multiple cores (e.g., a multi-core processor), multiple processors with a single core, multiple processors with multiples cores, or any combination thereof The memory/storage 1730 may include a memory 1732, such as a main memory, or other memory storage, and a storage unit 1736, both accessible to the processors 1710 such as via the bus 1702. The storage unit 1736 and memory 1732 store the instructions 1716 embodying any one or more of the methodologies or functions described herein. The instructions 1716 may also reside, completely or partially, within the memory 1732, within the storage unit 1736, within at least one of the processors 1710 (e.g., within the processor's cache memory), or any suitable combination thereof, during execution thereof by the machine 1700. Accordingly, the memory 1732, the storage unit 1736, and the memory of the processors 1710 are examples of machine-readable media.

As used herein, "machine-readable medium" means a device able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1716. The term "machine-readable medium" shall also be taken to include any medium, or combination of multiple media, that is capable of storing instructions (e.g., instructions 1716) for execution by a machine (e.g., machine 1700), such that the instructions, when executed by one or more processors of the machine (e.g., processors 1710), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 1750 may include a wide variety of components to receive input, provide output, produce output, transmit information, exchange information, capture measurements, and so on. The specific I/O components 1750 that are included in a particular machine will depend on the type of machine. For example, portable machines such as mobile phones will likely include a touch input device or other such input mechanisms, while a headless server machine will likely not include such a touch input device. It will be appreciated that the I/O components 1750 may include many other components that are not shown in FIG. 17. The I/O components 1750 are grouped according to functionality merely for simplifying the following discussion and the grouping is in no way limiting. In various example embodiments, the I/O components 1750 may include output components 1752 and input components 1754. The output components 1752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1750 may include biometric components 1756, motion components 1758, environmental components 1760, or position components 1762 among a wide array of other components. For example, the biometric components 1756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1758 may include acceleration sensor components (e.g., accelerometer), gravitation sensor components, rotation sensor components (e.g., gyroscope), and so forth. The environmental components 1760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1750 may include communication components 1764 operable to couple the machine 1700 to a network 1780 or devices 1770 via a coupling 1782 and a coupling 1772, respectively. For example, the communication components 1764 may include a network interface component or other suitable device to interface with the network 1780. In further examples, the communication components 1764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1770 may be another machine or any of a wide variety of peripheral devices (e.g., a peripheral device coupled via a Universal Serial Bus (USB)).

Moreover, the communication components 1764 may detect identifiers or include components operable to detect identifiers. For example, the communication components 1764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4117, Ultra Code, UCC RSS-2D bar code, and other optical codes), or acoustic detection components (e.g., microphones to identify tagged audio signals). In addition, a variety of information may be derived via the communication components 1764, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 1780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1780 or a portion of the network 1780 may include a wireless or cellular network and the coupling 1782 may be a Code Division Multiple Access (CDMA) connection, a Global System for Mobile communications (GSM) connection, or another type of cellular or wireless coupling. In this example, the coupling 1782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1716 may be transmitted or received over the network 1780 using a transmission medium via a network interface device (e.g., a network interface component included in the communication components 1764) and using any one of a number of well-known transfer protocols (e.g., hypertext transfer protocol (HTTP)). Similarly, the instructions 1716 may be transmitted or received using a transmission medium via the coupling 1772 (e.g., a peer-to-peer coupling) to the devices 1770. The term "transmission medium" shall be taken to include any intangible medium that is capable of storing, encoding, or carrying the instructions 1716 for execution by the machine 1700, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

In this document, the terms "a" or "an" are used, as is common in patent documents, to include one or more than one, independent of any other instances or usages of "at least one" or "one or more." In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

What is claimed is:

1. A method comprising:
    performing an analysis of historical staffing conditions of a manufacturing facility and one or more deviations from existing manufacturing procedures described in one or more deviation reports, the performing of the analysis including analyzing textual descriptions of the one or more deviations from existing manufacturing procedures included in the one or more deviation reports, the historical staffing conditions including historical information related to employees of the manufacturing facility;
    receiving, from a client device, a production target associated with the manufacturing facility, the production target comprising an anticipated output of the manufacturing facility;
    calculating, based on the analysis, a risk score based on the production target, the risk score providing a measure of risk associated with the anticipated output of the manufacturing facility, the calculating of the risk score being performed by one or more processors of a machine; and
    causing presentation of a user interface on the client device, the user interface including a display of the risk score.

2. The method of claim 1, wherein:
    the risk score is a first risk score;
    the operations further comprise calculating, based on the analysis, a second risk score based on current operational data, the current operational data including current staffing conditions of the manufacturing facility, the current risk score providing a measure of risk associated with the current operational data; and
    the user interface further includes a display of the second risk score.

3. The method of claim 1, wherein the user interface further includes a graph of historical risk scores of the manufacturing facility.

4. The method of claim 1, wherein the user interface further includes a breakdown of the one of more deviations from existing manufacturing procedures by at least one of type, subtype, root cause, location, product, or criticality.

5. The method of claim 1, further comprising:
    obtaining deviation data associated with the manufacturing facility, the deviation data including the one or more deviation reports, each of the one or more deviation reports including a textual description of a deviation from existing manufacturing procedures; and
    obtaining the historical operational data associated with the manufacturing facility.

6. The method of claim 1, wherein the historical staffing conditions include at least one of a total number of employees of the manufacturing facility, a total number of temporary employees of the manufacturing facility, a total cost corresponding to the employees of the manufacturing facility, an amount of goods created by the employees of the manufacturing facility, a total number of hours worked by the employees of the manufacturing facility, or a total number of overtime hours worked by the employees of the manufacturing facility.

7. The method of claim 1, further comprising determining a deviation type of each of the one or more deviations from existing manufacturing procedures based on an analysis of the textual description included in each of the one or more deviation reports;
    the user interface further including a breakdown of the one or more deviations by deviation type.

8. The method of claim 1, wherein the calculating of the risk score comprises:
    determining a risk metric value for each risk metric of the plurality of risk metrics based on the operational data;
    applying a weight to each of the risk metric values to generate weighted risk metric values; and
    calculating an average of the weighted risk metric values, wherein the risk score includes the average of the weighted risk metric values.

9. The method of claim 8, wherein the plurality of risk metrics includes a headcount change, a productivity measure, overtime hours as a percentage of all worked hours, and a percentage of employees who are temporary employees.

10. The method of claim 1, further comprising:
receiving, from the client device, anticipated future staffing conditions of the manufacturing facility, wherein the calculating of the risk score is further based on the anticipated future staffing conditions.

11. The method of claim 1, further comprising identifying a repeat deviation based on analysis of the one or more deviations reports, the repeat deviation corresponding to multiple occurrences of an identical deviation occurring within a predefined time range.

12. The method of claim 1, further comprising determining a risk level of the manufacturing facility based on the risk score, wherein the user interface includes a display of the risk level.

13. A system comprising:
one or more processors; and
a memory storing instructions that, when executed by the one or more processors, cause the one or more processors to perform operations comprising:
performing an analysis of historical staffing conditions of a manufacturing facility and one or more deviations from existing manufacturing procedures described in one or more deviation reports, the performing of the analysis including analyzing textual descriptions of the one or more deviations from existing manufacturing procedures included in the one or more deviation reports, the historical staffing conditions including historical information related to employees of the manufacturing facility;
receiving, from a client device, a production target associated with the manufacturing facility, the production target comprising an anticipated output of the manufacturing facility;
calculating, based on the analysis, a risk score based on the production target, the risk score providing a measure of risk associated with the anticipated output of the manufacturing facility, the calculating of the risk score being performed by one or more processors of a machine; and
causing presentation of a user interface on the client device, the user interface including a display of the risk score.

14. The system of claim 13, wherein:
the risk score is a first risk score;
the operations further comprise calculating, based on the analysis, a second risk score based on current operational data, the current operational data including current staffing conditions of the manufacturing facility, the current risk score providing a measure of risk associated with the current operational data; and
the user interface further includes a display of the second risk score.

15. The system of claim 13, wherein the user interface further includes a graph of historical risk scores of the manufacturing facility.

16. The system of claim 13, wherein the operations further comprise:
obtaining deviation data associated with the manufacturing facility, the deviation data including the one or more deviation reports, each of the one or more deviation reports including a textual description of a deviation from existing manufacturing procedures; and
obtaining the historical operational data associated with the manufacturing facility.

17. The system of claim 13, wherein the operations further comprise:
determining a deviation type of each of the one or more deviations from existing manufacturing procedures based on an analysis of the textual description included in each of the one or more deviation reports;
wherein the user interface further including a breakdown of the one or more deviations by deviation type.

18. The system of claim 13, wherein the calculating of the risk score comprises:
determining a risk metric value for each risk metric of the plurality of risk metrics based on the operational data;
applying a weight to each of the risk metric values to generate weighted risk metric values; and
calculating an average of the weighted risk metric values, wherein the risk score includes the average of the weighted risk metric values.

19. The system of claim 13, wherein the operations further comprise:
receiving, from the client device, anticipated future staffing conditions of the manufacturing facility, wherein the calculating of the risk score is further based on the anticipated future staffing conditions; and
determining a risk level of the manufacturing facility based on the anticipated future staffing conditions, wherein the user interface includes a display of the risk level.

20. A machine-readable storage medium embodying instructions that, when executed by at least one processor of a machine, cause the machine to perform operations comprising:
performing an analysis of historical staffing conditions of a manufacturing facility and one or more deviations from existing manufacturing procedures described in one or more deviation reports, the performing of the analysis including analyzing textual descriptions of the one or more deviations from existing manufacturing procedures included in the one or more deviation reports, the historical staffing conditions including historical information related to employees of the manufacturing facility;
receiving, from a client device, a production target associated with the manufacturing facility, the production target comprising an anticipated output of the manufacturing facility;
calculating, based on the analysis, a risk score based on the production target, the risk score providing a measure of risk associated with the anticipated output of the manufacturing facility, the calculating of the risk score being performed by one or more processors of a machine; and
causing presentation of a user interface on the client device, the user interface including a display of the risk score.

* * * * *